(12) United States Patent
Shimoshikiryoh et al.

(10) Patent No.: US 11,086,167 B2
(45) Date of Patent: Aug. 10, 2021

(54) LIQUID CRYSTAL DISPLAY PANEL, LIQUID CRYSTAL DISPLAY PANEL MANUFACTURING METHOD, AND LIQUID CRYSTAL DISPLAY PANEL MANUFACTURING DEVICE

(71) Applicant: SHARP KABUSHIKI KAISHA, Sakai (JP)

(72) Inventors: Fumikazu Shimoshikiryoh, Sakai (JP); Takehisa Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/895,324

(22) Filed: Jun. 8, 2020

(65) Prior Publication Data

US 2020/0301211 A1    Sep. 24, 2020

Related U.S. Application Data

(63) Continuation of application No. 15/764,493, filed as application No. PCT/JP2016/078146 on Sep. 26, 2016, now Pat. No. 10,747,062.

(30) Foreign Application Priority Data

Oct. 2, 2015  (JP) ................................. 2015-197076

(51) Int. Cl.
*G02F 1/1337* (2006.01)
*G02F 1/1343* (2006.01)
(Continued)

(52) U.S. Cl.
CPC ...... *G02F 1/133753* (2013.01); *G02F 1/1343* (2013.01); *G02F 1/133788* (2013.01);
(Continued)

(58) Field of Classification Search
CPC ......... G02F 1/133753; G02F 1/133788; G02F 1/1343; G02F 1/133757; G02F 1/136286; G02F 1/133516; G02F 1/1368
See application file for complete search history.

(56) References Cited

U.S. PATENT DOCUMENTS

| 6,501,524 B1 | 12/2002 | Yoshida et al. |
| 2009/0284703 A1 | 11/2009 | Shoraku et al. |

(Continued)

FOREIGN PATENT DOCUMENTS

| CN | 102445788 A | 5/2012 |
| CN | 103901681 A | 7/2014 |

(Continued)

OTHER PUBLICATIONS

Non-Final Office Action for U.S. Appl. No. 15/764,493 dated Jun. 27, 2019.
Notice of Allowance and Fees Due for U.S. Appl. No. 15/764,493 dated Feb. 3, 2020.

*Primary Examiner* — Phu Vu
(74) *Attorney, Agent, or Firm* — ScienBiziP, P.C.

(57) ABSTRACT

A liquid crystal display panel includes in the following order: a first substrate including pixel electrodes; a first vertical alignment film; a liquid crystal layer containing liquid crystal molecules; a second vertical alignment film; and a second substrate including a counter electrode. The liquid crystal display panel includes pixels each including four alignment regions which provide different tilt azimuths to the liquid crystal molecules and are arranged in a longitudinal direction of each pixel. The liquid crystal display panel includes first, second, third, and fourth alignment regions providing the respective specific alignment azimuths. The liquid crystal molecules are aligned in a direction substantially perpendicular to the first and second vertical alignment films and at a tilt in the respective tilt azimuth directions with no voltage applied to the liquid (Continued)

crystal layer and are to be more tilted in the respective tilt azimuth directions upon application of voltage to the liquid crystal layer. The liquid crystal molecules are at a twist angle of substantially 0° in each of the four alignment regions.

24 Claims, 22 Drawing Sheets

(51) Int. Cl.
*G02F 1/1362* (2006.01)
*G02F 1/1335* (2006.01)
*G02F 1/1368* (2006.01)

(52) U.S. Cl.
CPC ...... *G02F 1/1368* (2013.01); *G02F 1/133516* (2013.01); *G02F 1/133757* (2021.01); *G02F 1/136286* (2013.01)

(56) References Cited

U.S. PATENT DOCUMENTS

| | | |
|---|---|---|
| 2012/0002144 A1 | 1/2012 | Shoraku et al. |
| 2012/0293763 A1* | 11/2012 | Inoue ........................ G03F 1/50 349/178 |
| 2013/0114029 A1 | 5/2013 | Shoraku et al. |
| 2015/0036073 A1 | 2/2015 | Im et al. |
| 2015/0037073 A1 | 2/2015 | Furukawa et al. |
| 2016/0195783 A1 | 7/2016 | Song et al. |
| 2016/0299382 A1 | 10/2016 | Seo |

FOREIGN PATENT DOCUMENTS

| | | |
|---|---|---|
| JP | 2000-193976 A | 7/2000 |
| JP | 2011-085738 A | 4/2011 |
| JP | 5184618 B2 | 4/2013 |
| JP | 2015-031961 A | 2/2015 |

\* cited by examiner

Fig. 14

| | First | | Second | | Third | | Fourth | | Combined |
|---|---|---|---|---|---|---|---|---|---|
| TFT substrate | Pre-tilt azimuth | Light irradiation direction / Moving direction of substrate / light source | Pre-tilt azimuth | Light irradiation direction / Moving direction of substrate / light source | Pre-tilt azimuth | Light irradiation direction / Moving direction of substrate / light source | Pre-tilt azimuth | Light irradiation direction / Moving direction of substrate / light source | |

Fig. 15

| | CF substrate | | | | | | | |
|---|---|---|---|---|---|---|---|---|
| | First | | Second | | Third | | Fourth | Combined |
| | Pre-tilt azimuth | Light irradiation direction / Moving direction of substrate / light source | Pre-tilt azimuth | Light irradiation direction / Moving direction of substrate / light source | Pre-tilt azimuth | Light irradiation direction / Moving direction of substrate / light source | Pre-tilt azimuth | Light irradiation direction / Moving direction of substrate / light source | |

Fig. 21
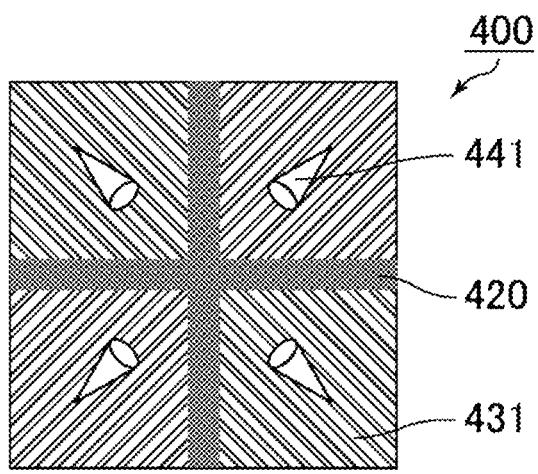
Fig. 22
(a) TFT substrate
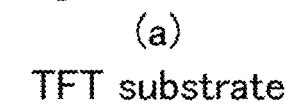
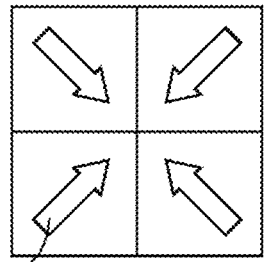
(b) CF substrate
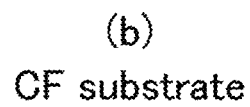
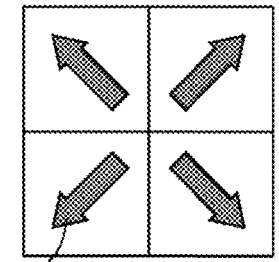
(c)
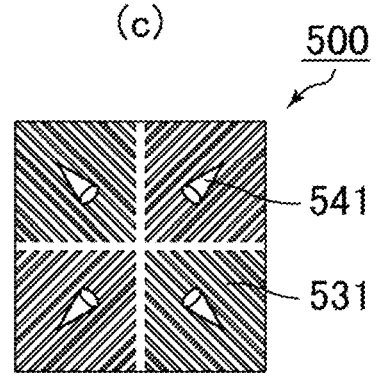

Fig. 27
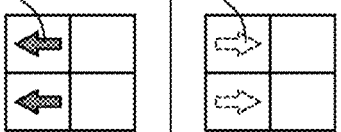
Fig. 28
(a) TFT substrate  (b) CF substrate  (c)
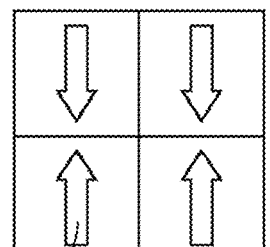
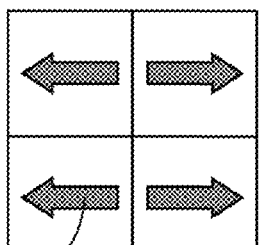
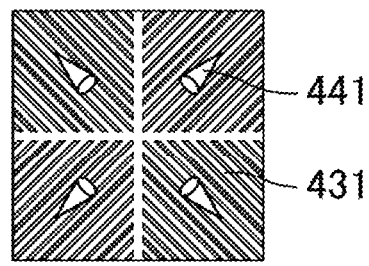

Fig. 30

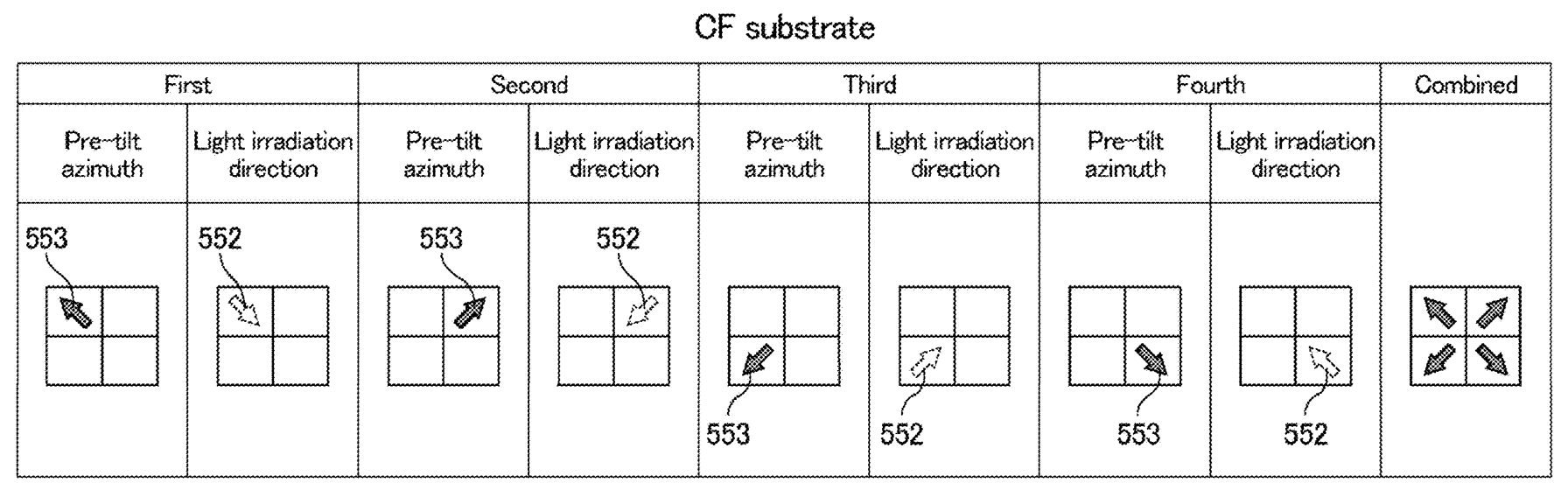

| | First | | Second | | Third | | Fourth | | Combined |
|---|---|---|---|---|---|---|---|---|---|
| CF substrate | Pre-tilt azimuth | Light irradiation direction | Pre-tilt azimuth | Light irradiation direction | Pre-tilt azimuth | Light irradiation direction | Pre-tilt azimuth | Light irradiation direction | |

LIQUID CRYSTAL DISPLAY PANEL, LIQUID CRYSTAL DISPLAY PANEL MANUFACTURING METHOD, AND LIQUID CRYSTAL DISPLAY PANEL MANUFACTURING DEVICE

TECHNICAL FIELD

The present invention relates to liquid crystal display panels, methods for manufacturing a liquid crystal display panel, and devices for manufacturing a liquid crystal display panel. More specifically, the present invention relates to a liquid crystal display panel including regions providing different tilt azimuths to liquid crystal molecules, a manufacturing method thereof, and a device for manufacturing the liquid crystal display panel.

BACKGROUND ART

Liquid crystal display devices utilize a liquid crystal composition to provide display. A typical display method for such devices irradiates a liquid crystal display panel including a liquid crystal composition enclosed between paired substrates with light from the backlight and applies voltage to the liquid crystal composition to change the alignment of liquid crystal molecules, thereby controlling the amount of light passing through the liquid crystal display panel. Such liquid crystal display devices have a thin profile, light weight, and low power consumption, and are therefore utilized in electronic products such as smartphones, tablet PCs, and automotive navigation systems.

Alignment division techniques have been studied which divide one pixel into multiple alignment regions (domains) to align the liquid crystal molecules at different azimuths in different alignment regions such that the viewing angle characteristics are enhanced. The alignment of a pixel can be divided by, for example, a method that divides a half-pixel into four alignment regions of two rows by two columns. Examples of such an alignment mode include 4 domain-reverse twisted nematic (4D-RTN) mode (e.g., Patent Literature 1, Patent Literature 2) and 4 domain-electrically controlled birefringence (4D-ECB) mode (e.g., Patent Literature 2).

CITATION LIST

Patent Literature

Patent Literature 1: JP 5184618 B
Patent Literature 2: JP 2011-85738 A

SUMMARY OF INVENTION

Technical Problem

At borders of regions providing different alignment azimuths to liquid crystal molecules, the alignment of liquid crystal molecules is irregular. In provision of liquid crystal display, the regions with irregular alignment of liquid crystal molecules do not transmit light and are therefore observed as dark lines, decreasing the transmittance (contrast ratio) and deteriorating the response performance. For this reason, in the case of dividing one pixel into multiple alignment regions, increasing the number of alignment regions formed in each alignment region enhances the viewing angle characteristics, but also unfortunately increases the number of regions with irregular alignment of liquid crystal molecules, whereby the number of regions observed as dark lines tends to increase.

FIG. 19 is a schematic plan view of a half pixel, showing exemplary regions observed as dark lines in a first conventional 4D-RTN mode liquid crystal display panel 300 with voltage applied. In FIG. 19, the half pixel is divided into four alignment regions of two rows by two columns where liquid crystal molecules 341 are aligned at different tilt azimuths. As shown in FIG. 19, in the 4D-RTN mode liquid crystal display panel 300, dark lines 320 appearing as a fylfot cross are generated. The present inventors have further simulated generation of dark lines and observed the alignment state of the liquid crystal molecules. FIG. 20 is a photograph of a half pixel showing a simulation result of dark line generation in the first conventional 4D-RTN mode liquid crystal display panel. FIG. 20 shows that the alignment of liquid crystal molecules is irregular near the outer edges of the pixel and at the borders of alignment regions, giving dark lines. This means that the proportion of regions with regularly aligned liquid crystal molecules, i.e., regions other than dark lines, is low as in the case where, for example, one pixel has a size of 82 μm in width and 245 μm in length and the width of the dark line 320 is about 10 μm. Also, in regions where the alignment of liquid crystal molecules is irregular, the response performance of the liquid crystal molecules is low. This may cause a white tailing phenomenon (phenomenon in which a line which looks like a white tail is observed) and a black tailing phenomenon (phenomenon in which a line which looks like a black tail is observed). A white tailing phenomenon may be observed when, for example, a black rectangular image moving from one side to the other side of the display screen of a liquid crystal display device is provided on the display screen with an intermediate grayscale background. This is because the luminance of the region opposite to the moving direction of the black rectangular image may be higher than that of the intermediate grayscale background. As with the case of the white tailing phenomenon, a black tailing phenomenon may be observed when, for example, a moving black rectangular image is provided on the liquid crystal display with an intermediate grayscale background.

In Patent Literature 2, increase in the transmittance of a 4D-RTN mode liquid crystal display panel is considered using an electrode configuration including a main part and multiple branches extending parallel to each other from the main part. FIG. 21 is a schematic plan view of a half pixel showing exemplary regions observed as dark lines in a second conventional 4D-RTN mode liquid crystal display panel 400 with voltage applied. In FIG. 21, the half pixel is divided into four alignment regions of two rows by two columns where liquid crystal molecules 441 are aligned at different tilt azimuths. The 4D-RTN liquid crystal display panel 400 reduces alignment disorder of the liquid crystal molecules by utilizing the electrode configuration of a pixel electrode. This reduces regions with irregular alignment of the liquid crystal molecules 441 and can thereby reduce a response function decrease, so that a white tailing phenomenon is presumed to be less observed. The 4D-RTN liquid crystal display panel 400 can reduce the width of the dark lines, but produces dark lines 420 appearing as a cross shape.

In Patent Literature 1, 4D-RTN mode liquid crystal display panels have been studied including one in which the alignment of one pixel is divided into four row by one column.

The recent increase in definition of pixels requires reduction in area per pixel. The area of dark lines, however, remains the same even when the size of pixels is reduced, and thus the proportion of the area of dark lines in a pixel increases. Hence, more studies are needed to achieve favorable viewing angle characteristics and a high transmittance while responding to the increase in definition.

The present invention has been made in view of the above current state of the art, and aims to provide a liquid crystal display panel reducing generation of dark lines to achieve a high transmittance.

Solution to Problem

The inventors of the present invention have made studies on the method for dividing a pixel into multiple alignment regions while reducing generation of dark lines in a vertical alignment mode liquid crystal display panel. The inventors have then found that the viewing angle characteristics can be achieved by forming four alignment regions providing different tilt azimuths to liquid crystal molecules in a pixel, specifically by forming alignment regions providing tilt azimuths of substantially 45°, 135°, 225°, and 315° to liquid crystal molecules in the four alignment regions, with the azimuth in the transverse direction of the pixels being defined as 0°. The inventors have further studied the formation method and arrangement of four alignment regions which can prevent generation of dark lines. As a result, the inventors have found a new alignment control mode that can reduce generation of dark lines while responding to the increase in definition. The alignment control mode aligns the liquid crystal molecules at a twist angle of substantially 0° in each of the four alignment regions and arranges the four alignment regions in the longitudinal direction of the pixel, in a plan view of the liquid crystal display panel. The inventors have thereby solved the above problems, arriving at the present invention.

In other words, one aspect of the present invention may be a liquid crystal display panel including in the following order: a first substrate including pixel electrodes; a first vertical alignment film; a liquid crystal layer containing liquid crystal molecules; a second vertical alignment film; and a second substrate including a counter electrode, the liquid crystal display panel including pixels each including four alignment regions which provide different tilt azimuths to the liquid crystal molecules and are arranged in a longitudinal direction of each pixel, with the azimuth in a transverse direction of each pixel defined as 0°, the pixels each including a first alignment region providing a tilt azimuth of substantially 45°, a second alignment region providing a tilt azimuth of substantially 135°, a third alignment region providing a tilt azimuth of substantially 225°, and a fourth alignment region providing a tilt azimuth of substantially 315°, the liquid crystal molecules being aligned in a direction substantially perpendicular to the first vertical alignment film and the second vertical alignment film and at a tilt in the respective tilt azimuth directions with no voltage applied to the liquid crystal layer and being to be more tilted in the respective tilt azimuth directions upon application of voltage to the liquid crystal layer, the liquid crystal molecules being at a twist angle of substantially 0° in each of the four alignment regions in a plan view of the liquid crystal display panel. The "azimuth" as used herein means a direction in a view projected on a substrate surface without consideration of the tilt angle (i.e., polar angle, pre-tilt angle) from the normal direction of the substrate surface. For example, if an x-axis and a y-axis perpendicular to the x-axis form an xy plane parallel to the substrate surfaces and the x-axis direction is defined as 0°, the azimuth is determined counterclockwise in a positive value. The "tilt azimuth" as used herein means an azimuth at which liquid crystal molecules tilt relative to the first substrate.

The inventors have then studied the method for manufacturing the liquid crystal display panel in the above new alignment control mode. They have focused on using photo-alignment films as the first vertical alignment film and the second vertical alignment film and performing photo-alignment treatment on the films to provide a pre-tilt angle. The photo-alignment treatment can be performed by, for example, scanning exposure which performs exposure by irradiating a substrate with light from a light source through a polarizer while moving the substrate or the light source.

The following describes an exemplary conventional method for manufacturing a 4D-RTN mode liquid crystal display panel. FIG. 23 and FIG. 24 are views illustrating an exemplary photo-alignment treatment step for the first conventional 4D-RTN mode liquid crystal display panel 300. FIG. 23 shows a photo-alignment treatment step for a TFT substrate. FIG. 24 shows a photo-alignment treatment step for a CF substrate. Also, FIG. 26 and FIG. 27 are views illustrating an exemplary photo-alignment treatment step for the second conventional 4D-RTN mode liquid crystal display panel 400. FIG. 26 shows a photo-alignment treatment step for a TFT substrate. FIG. 27 shows a photo-alignment treatment step for a CF substrate. As shown in FIG. 23 and FIG. 24, in the photo-alignment treatment step for the liquid crystal display panel 300, the moving direction of the substrate or the light source is parallel to the light irradiation direction. In contrast, as shown in FIG. 26 and FIG. 27, in the photo-alignment treatment step for the liquid crystal display panel 400, the moving direction of the substrate or the light source is perpendicular to the light irradiation direction. The details of the steps are described later.

The conventional photo-alignment treatment typically performs light irradiation by setting the polarization axis of the polarizer to be the same as the light irradiation direction, and the alignment treatment direction is limited to the light irradiation direction. In the method for manufacturing the conventional 4D-RTN mode liquid crystal display panel 400, for example, the moving direction of the substrate or the light source is perpendicular to the light irradiation direction. The studies made by the inventors have revealed that scanning exposure in such a method produces various pre-tilt angles to deteriorate the display quality, so that it is difficult to perform photo-alignment treatment by scanning exposure, which is highly productive, due to the following reason. In the case of irradiating a substrate with light from a light source at a given angle, the incident angle of the light incident on the substrate surface in a light irradiation area of one light source is smaller at a position farther from the light source. Hence, in the case where the moving direction of the substrate or the light source is perpendicular to the light irradiation direction, different pre-tilt angles (polar angles) are provided to liquid crystal molecules near the light source and those away from the light source in the light irradiation area. This increases the degree of variation of pre-tilt angles in the light irradiation area, thereby deteriorating the display quality.

The studies made by the inventors have also revealed that in the 4D-RTN mode liquid crystal display panel 400 having an electrode configuration as shown in FIG. 21, liquid crystal molecules in each alignment region are aligned by electric fields generated by slits 431 formed in the pixel electrode when voltage is applied. Here, the rotation directions for the liquid crystal molecules by the electric fields are different from the pre-tilt azimuths. Thus, pushing the display screen of the liquid crystal display panel with a finger, for example, may disturb the alignment of liquid crystal molecules, leaving a mark of pushing with a finger even after removal of the finger.

Meanwhile, for example, in a conventional 4D-ECB mode liquid crystal display panel 500 as shown in FIG. 22, a mark of pushing with a finger is not likely to be left. FIG. 22 shows schematic plan views illustrating exemplary tilt azimuths provided by the TFT substrate and the CF substrate in the conventional 4D-ECB mode liquid crystal display panel 500 and exemplary tilt azimuths of liquid crystal molecules. FIG. 22(*a*) shows the pre-tilt azimuths provided by the TFT substrate. FIG. 22(*b*) shows the pre-tilt azimuths provided by the CF substrate. FIG. 22(*c*) shows the tilt azimuths of liquid crystal molecules 541 in the respective alignment regions when voltage is applied. As shown in FIG. 22(*a*) and FIG. 22(*b*), pre-tilt azimuths 553 provided by the TFT substrate and the pre-tilt azimuths 553 provided by the CF substrate are parallel to each other in the respective regions. This configuration causes the rotation directions for the liquid crystal molecules provided by the electric fields to be the same as the respective pre-tilt azimuths 553 as shown in FIG. 22(*c*), so that a mark of pushing with a finger is not likely to be left.

The inventors, however, found that the 4D-ECB mode liquid crystal display panel 500 exhibits low productivity because photo-alignment treatment cannot be performed by scanning exposure. FIG. 29 and FIG. 30 are views illustrating an exemplary photo-alignment treatment step for the conventional 4D-ECB mode liquid crystal display panel 500. FIG. 29 shows a photo-alignment treatment step for a TFT substrate. FIG. 30 shows a photo-alignment treatment step for a CF substrate. As shown in FIG. 28 (the details are described later), the half pixel is divided into alignment regions of two rows by two columns, and the light irradiation directions for the respective alignment regions are different. When half pixels having such an alignment division pattern are arranged in the row direction and the column direction of a liquid crystal display panel, the alignment regions with different pre-tilt azimuths are arranged alternately in the row direction and the column direction. Scanning exposure for photo-alignment treatment is performed for columns or rows while the substrate or the light source is moved in one direction. Hence, photo-alignment treatment cannot be performed by scanning exposure when alignment regions providing the same pre-tilt azimuth are not arranged in the row direction and the column direction as in the case of the liquid crystal display panel 500.

The inventors have then studied the method for performing photo-alignment treatment while keeping the moving direction of the substrate or the light source being parallel to the light irradiation direction. As a result, they have found that by setting the polarization axis of the polarizer and the light irradiation direction to be different from each other, preferably to form an angle of substantially 45°, four alignment regions providing different tilt azimuths to liquid crystal molecules can be formed in each pixel easily by scanning exposure, which is highly productive.

In other words, another aspect of the present invention may be a method for manufacturing a liquid crystal display panel, including a photo-alignment treatment step of irradiating, with light from a light source through a polarizer, a first substrate provided with a first vertical alignment film on a surface and a second substrate provided with a second vertical alignment film on a surface, wherein the first vertical alignment film and the second vertical alignment film are photo-alignment films which, upon being subjected to photo-alignment treatment, provide a pre-tilt angle to the liquid crystal molecules, the photo-alignment treatment step includes performing the light irradiation while moving the first substrate or the second substrate or moving the light source relative to the first substrate or the second substrate, the light irradiation direction for the first substrate or the second substrate is parallel to the moving direction of the first substrate or the second substrate or the moving direction of the light source, and a polarization axis of the polarizer is different from the light irradiation direction. The polarization axis of the polarizer and the light irradiation direction preferably form an angle of substantially 45°. Furthermore, a polarization axis of the polarizer projected on a surface of the first substrate or a surface of the second substrate and the light irradiation direction may form an angle of substantially 45°.

Since the light irradiation direction for the first substrate or the second substrate is parallel to the moving direction of the first substrate or the second substrate or the moving direction of the light source, the incident angles of light incident on the substrate from one light source are substantially the same in a light irradiation area of the light source, so that the pre-tilt angles (polar angles) provided to liquid crystal molecules are substantially the same. This configuration decreases the degree of variation of pre-tilt angles in the light irradiation area and gives favorable display quality.

The inventors have further made studies on devices for manufacturing a liquid crystal display panel. As a result, they have found that with a device for manufacturing a liquid crystal display panel which includes a mechanism configured to irradiate a substrate with light from a light source through a polarizer and sets the polarization axis of the polarizer and the light irradiation direction to be different from each other, preferably to form an angle of substantially 45°, four alignment regions providing different tilt azimuths to liquid crystal molecules can be formed in each pixel while the moving direction of the substrate and the irradiation direction of the light source are kept parallel to each other.

In other words, yet another aspect of the present invention may be a device for manufacturing a liquid crystal display panel, including a mechanism configured to irradiate, with light from a light source through a polarizer, a first substrate provided with a first vertical alignment film on a surface and a second substrate provided with a second vertical alignment film on a surface, wherein the first vertical alignment film and the second vertical alignment film are photo-alignment films which, upon being subjected to photo-alignment treatment, provide a pre-tilt angle to the liquid crystal molecules, the mechanism is configured to perform the light irradiation while moving the first substrate or the second substrate or moving the light source relative to the first substrate or the second substrate, the light irradiation direction for the first substrate or the second substrate is parallel to the moving direction of the first substrate or the second substrate or the moving direction of the light source, and a polarization axis of the polarizer is different from the light irradiation direction. The polarization axis of the polarizer and the light irradiation direction preferably form an angle of substantially 45°. Furthermore, a polarization axis of the polarizer projected on a surface of the first substrate or a surface of the second substrate and the light irradiation direction may form an angle of substantially 45°.

Advantageous Effects of Invention

The liquid crystal display panel of the present invention includes four alignment regions providing different tilt azimuths to liquid crystal molecules in each pixel, and therefore can exhibit reduced dark lines and an increased transmittance. The method for manufacturing a liquid crystal display panel according to the present invention and the device for manufacturing a liquid crystal display panel according to the present invention can form four alignment regions providing different tilt azimuths to liquid crystal molecules by an easy method while keeping the moving direction of the substrate or the light source being parallel to the light irradiation direction.

BRIEF DESCRIPTION OF DRAWINGS

FIG. 14 is a view illustrating an exemplary photo-alignment treatment step for a TFT substrate in a liquid crystal display panel of Example 1.

FIG. 15 is a view illustrating an exemplary photo-alignment treatment step for a CF substrate in the liquid crystal display panel of Example 1.

FIG. 21 is a schematic plan view of a half pixel showing exemplary regions observed as dark lines in a second conventional 4D-RTN mode liquid crystal display panel.

FIG. 22 shows schematic plan views illustrating exemplary pre-tilt azimuths provided by the TFT substrate and the CF substrate and exemplary tilt azimuths of liquid crystal molecules in a conventional 4D-ECB mode liquid crystal display panel.

FIG. 27 is a view illustrating an exemplary photo-alignment treatment step for a CF substrate in the second conventional 4D-RTN mode liquid crystal display panel.

FIG. 28 shows schematic plan views illustrating exemplary pre-tilt azimuths provided by the TFT substrate and the CF substrate and exemplary tilt azimuths of liquid crystal molecules in the second conventional 4D-RTN mode liquid crystal display panel.

FIG. 30 is a view illustrating an exemplary photo-alignment treatment step for a CF substrate in the conventional 4D-ECB mode liquid crystal display panel.

DESCRIPTION OF EMBODIMENTS

Hereinafter, embodiments of the present invention are described. The following embodiments, however, are not intended to limit the scope of the present invention, and appropriate modifications can be made within the spirit of the present invention.

Figure 1:
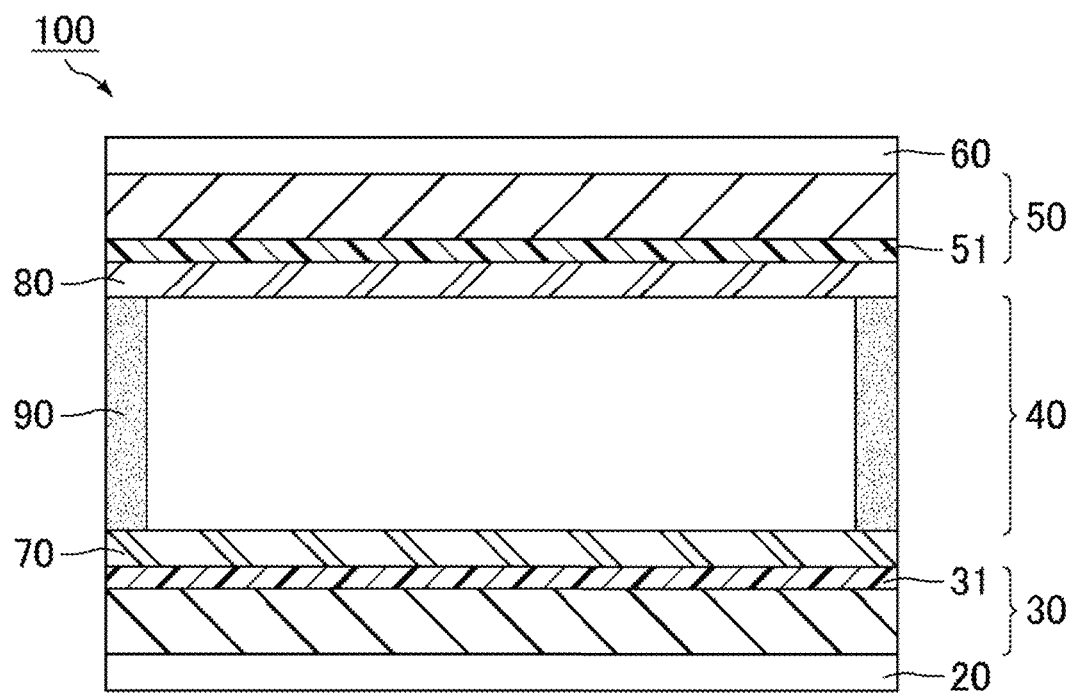
FIG. 1 is a cross-sectional view schematically showing an exemplary liquid crystal display panel of the present invention.
Figure 2:
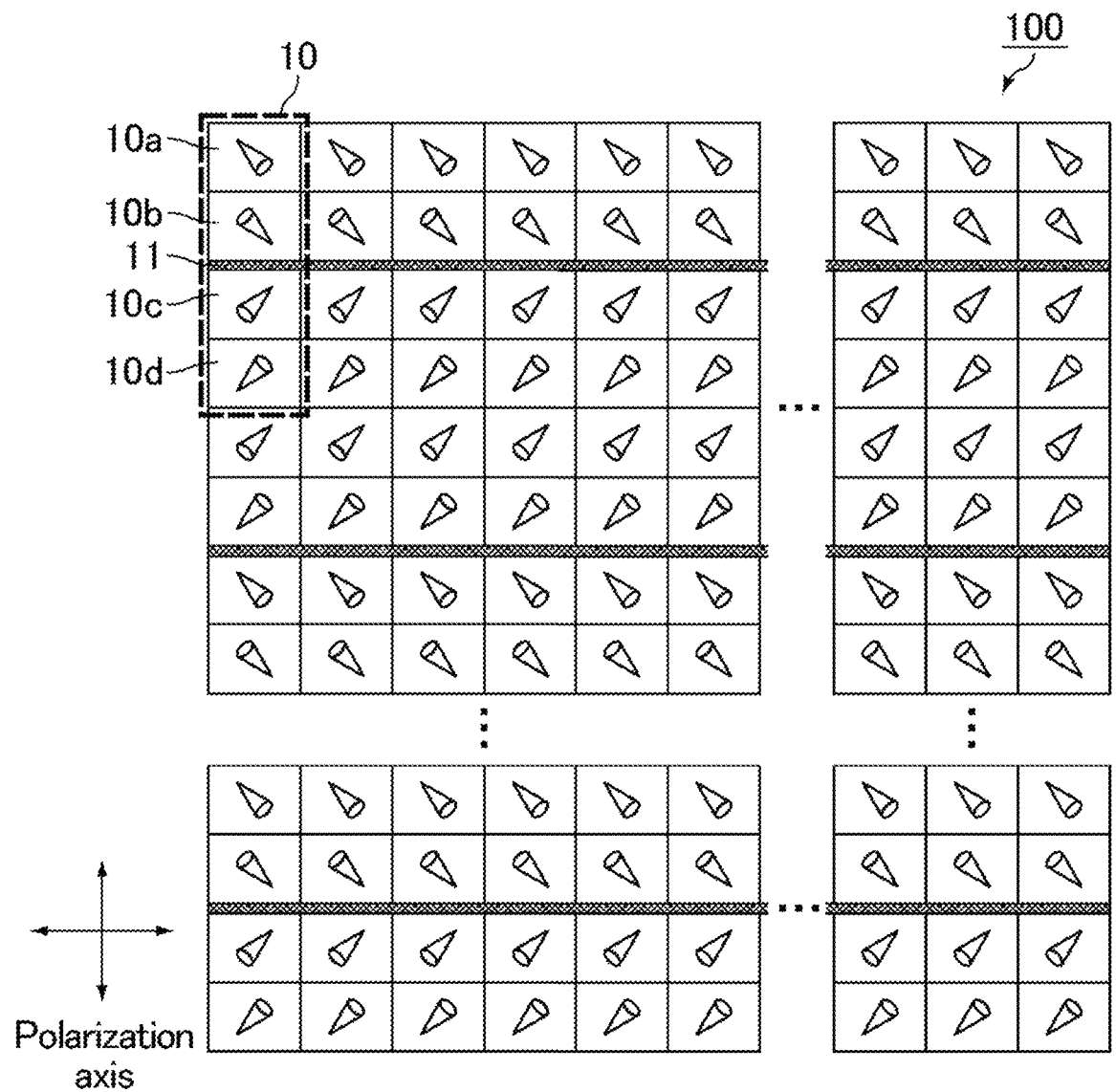
FIG. 2 is a plan view schematically showing an exemplary liquid crystal display panel of the present invention.

FIG. 1 is a cross-sectional view schematically showing an exemplary liquid crystal display panel of the present invention. FIG. 2 is a plan view schematically showing an exemplary liquid crystal display panel of the present invention. As shown in FIG. 1, a liquid crystal display panel 100 of the present embodiment includes, in the following order, a first substrate 30 including pixel electrodes 31, a first vertical alignment film 70, a liquid crystal layer 40 containing liquid crystal molecules, a second vertical alignment film 80, and a second substrate 50 including a counter electrode 51. The liquid crystal layer 40 is surrounded by a sealing material 90. As shown in FIG. 2, the liquid crystal display panel 100 of the present embodiment includes pixels 10 arranged in a matrix. In the drawings, the liquid crystal molecules are depicted as cones whose base is oriented to the observer.

The first substrate 30 includes the pixel electrodes 31 and may be, for example, an active matrix substrate (TFT substrate). The TFT substrate can be one commonly used in the field of liquid crystal display panels. The first substrate 30 may further include signal lines 11 (e.g., gate signal lines) which may be arranged to cross the pixels 10 in the transverse direction. The TFT substrate may have a configuration including on a transparent substrate, in a plan view thereof, parallel source signal lines; parallel gate signal lines extending perpendicular to the source signal lines; active elements such as TFTs arranged at intersections of the source signal lines and the gate signal lines; and pixel electrodes 31 arranged in a matrix in regions defined by the source signal lines and the gate signal lines. The TFTs preferably include channels formed of an oxide semiconductor. The source signal lines and gate signal lines may be those commonly used in the field of liquid crystal display panels, and can be formed of a metal such as titanium, chromium, aluminum, or molybdenum, or an alloy of these metals, for example. The oxide semiconductor may be, for example, a compound (In—Ga—Zn—O) formed of indium (In), gallium (Ga), zinc (Zn), and oxygen (O), a compound (In-Tin-Zn—O) formed of indium (In), tin (Tin), zinc (Zn), and oxygen (O), or a compound (In—Al—Zn—O) formed of indium (In), aluminum (Al), zinc (Zn), and oxygen (O).

Figure 3:
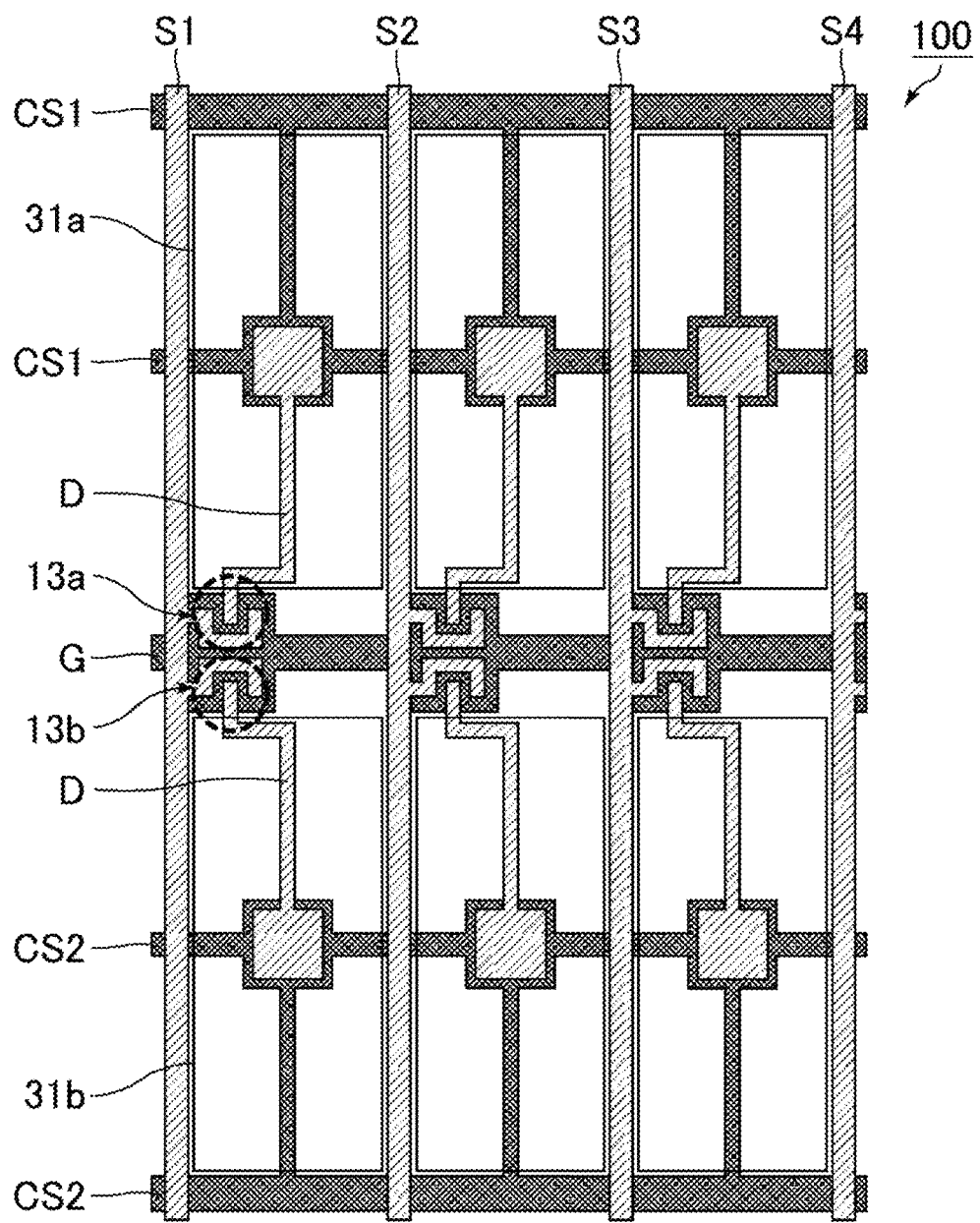
FIG. 3 is a plan view schematically showing an exemplary first substrate.
Figure 4:
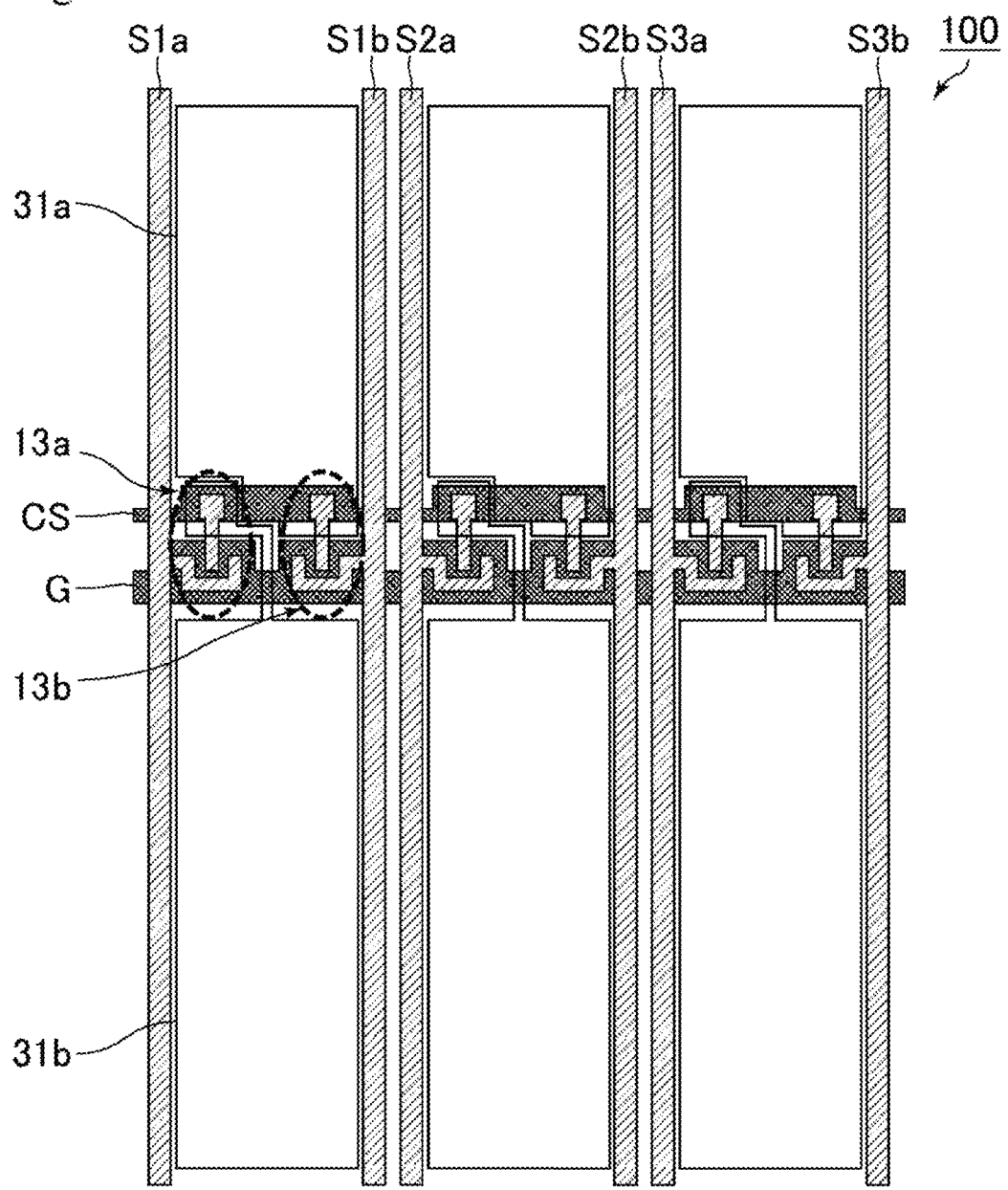
FIG. 4 is a plan view schematically showing another exemplary first substrate.
Figure 5:
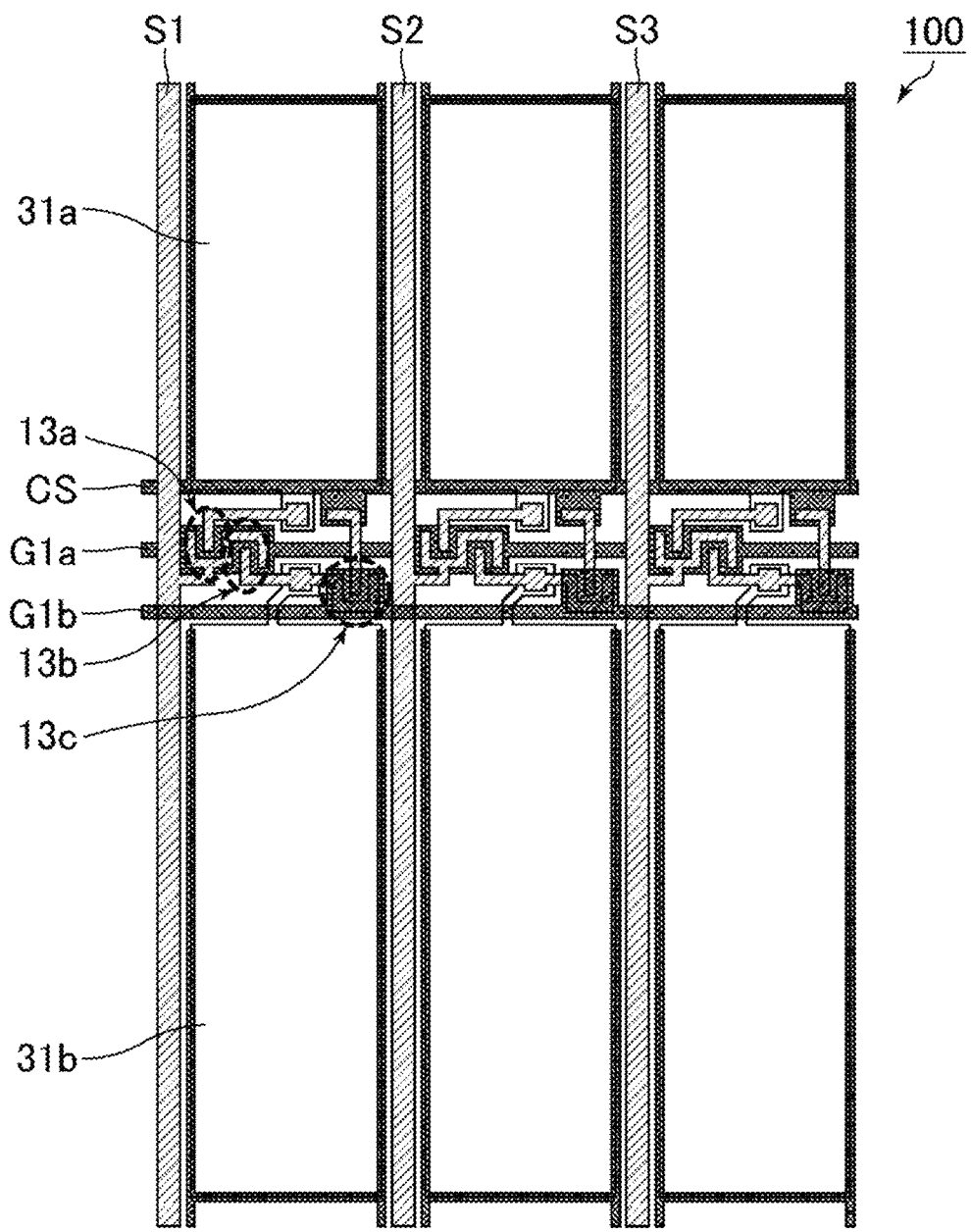
FIG. 5 is a plan view schematically showing yet another exemplary first substrate.

FIG. 3 to FIG. 5 are plan views schematically showing exemplary first substrates. As shown in FIG. 3 to FIG. 5, one pixel may include two alignment division parts, and a first pixel electrode 31a and a second pixel electrode 31b may receive signals via different TFTs.

As shown in FIG. 3, for example, one gate line G may be arranged to cross the center of each pixel in the transverse direction of the pixels, and source signal lines S1, S2, S3, and S4 may be arranged to be perpendicular to the gate signal line G. Capacitance lines CS1 and CS2 may be arranged parallel to the gate signal line G. Two TFTs 13a and 13b may be arranged at intersections of the gate signal line G and the source signal line CS1. A drain line D connected to the TFT 13a may be electrically connected to the first pixel electrode 31a when the TFT 13a is turned on, and a drain line D connected to the TFT 13b may be electrically connected to the second pixel electrode 31b when the TFT 13b is turned on. Furthermore, the capacitance line CS1 may be formed at a position where the drain line D connected to the TFT 13a is connected to the first pixel electrode 31a, while the capacitance line CS2 may be formed at a position where the drain line D connected to the TFT 13b is connected to the second pixel electrode 31b. The capacitance lines CS1 and CS2 are each preferably arranged to cross the center of the half pixel in the transverse direction of the pixel. Arrangement of the capacitance lines CS1 and CS2 to superimpose them on the borders of two adjacent alignment regions reduces the chances of dark line observation.

As shown in FIG. 4, for example, one gate signal line G may be arranged to cross the center of each pixel in the transverse direction of the pixels, and source signal lines S1a, S1b, S2a, S2b, S3a, and S3b may be arranged to be perpendicular to the gate signal line G. In other words, one gate signal line G and two source signal lines may be arranged in one pixel. A capacitance line CS may be arranged to be parallel to the gate signal line G. The TFT 13a may be arranged at an intersection of the gate signal line G and the source signal line S1a, and the TFT 13b may be arranged at an intersection of the gate signal line G and the source signal line S1b.

A drain line connected to the TFT 13a may be electrically connected to the second pixel electrode 31b when the TFT 13a is turned on, and a drain line connected to the TFT 13b may be electrically connected to the first pixel electrode 31a when the TFT 13b is turned on. Furthermore, the capacitance line CS may be formed at a position where the drain line connected to the TFT 13a is connected to the second pixel electrode 31b and at a position where the drain line connected to the TFT 13b is connected to the first pixel electrode 31a.

As shown in FIG. 5, for example, two gate signal lines G1a and G1b may be arranged to cross the center of each pixel in the transverse direction of the pixels, and source signal lines S1, S2, and S3 may be arranged to be perpendicular to the gate signal lines G1a and G1b. Three TFTs 13a, 13b, and 13c may be arranged in one pixel. The TFT 13a and the TFT 13b may be arranged at an intersection of the gate signal line G1a and the source signal line S1. A drain line connected to the TFT 13a may be electrically connected to the first pixel electrode 31a when the TFT 13a is turned on, and a drain line connected to the TFT 13b may be electrically connected to the second pixel electrode 31b when the TFT 13b is turned on. Furthermore, the drain line connected to the TFT 13b may form a TFT 13c with the gate signal line G1b, and a drain line connected to the TFT 13c may be connected to the capacitance line CS.

The liquid crystal layer 40 contains liquid crystal molecules 41. Liquid crystal molecules are aligned in the direction substantially perpendicular to the first substrate 30 and the second substrate 50 at a tilt in the respective tilt azimuth directions with no voltage applied to the liquid crystal layer 40 and may be more tilted in the respective tilt azimuth directions upon application of voltage to the liquid crystal layer 40. Here, the liquid crystal display panel can provide display when the liquid crystal molecules are more tilted in the respective tilt azimuth directions. The liquid crystal molecules near the outer edge of each pixel are aligned from the outside to the inside of the pixel, while the liquid crystal molecules near the center of the pixel are tilted at an azimuth in the alignment treatment direction upon application of voltage to the liquid crystal layer 40.

Figure 6:
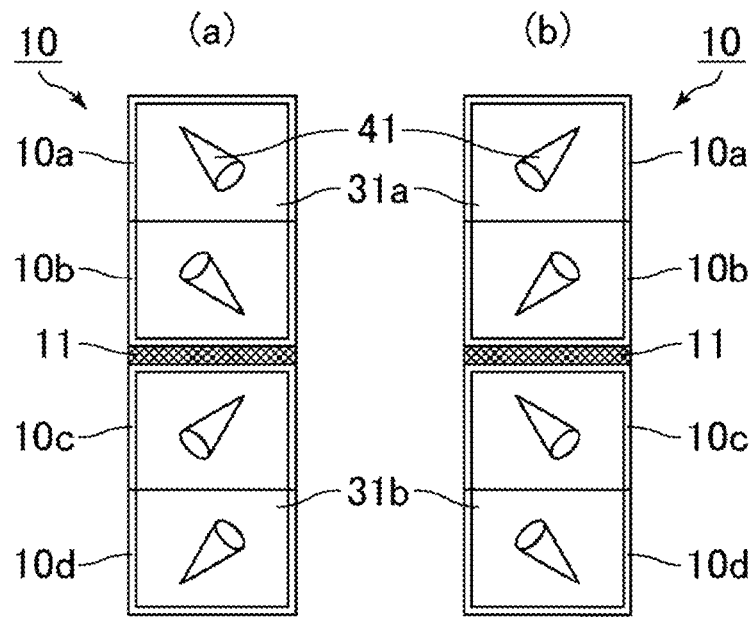
FIG. 6 shows schematic plan views of one pixel showing exemplary relations between a pixel electrode and alignment regions in the liquid crystal display panel of the present invention.

FIG. 6 shows schematic plan views of one pixel showing exemplary relations between a pixel electrode and alignment regions in the liquid crystal display panel of the present invention. The pixels 10 each include four alignment regions 10a, 10b, 10c, and 10d which provide different tilt azimuths to the liquid crystal molecules 41 and are arranged in a longitudinal direction of the pixel 10. With the azimuth in a transverse direction of each pixel defined as 0°, the pixels each include a first alignment region providing a tilt azimuth of substantially 45°, a second alignment region providing a tilt azimuth of substantially 135°, a third alignment region providing a tilt azimuth of substantially 225°, and a fourth alignment region providing a tilt azimuth of substantially 315°. The transmittance of a pixel reaches the highest when the tilt azimuth of the liquid crystal molecules forms an angle of 45° with the polarization axis of the polarizing plate. Hence, the transmittance can be made highest by setting the azimuth in the transverse direction of the pixel 10 and the polarization axis of one of the polarizing plates to be parallel to each other and providing tilt azimuths of 45°, 135°, 225°, and 315° to liquid crystal molecules, with the azimuth in the transverse direction of the pixels defined as 0°. The first alignment region, the second alignment region, the third alignment region, and the fourth alignment region may be arranged in any order. The "tilt azimuths of substantially 45°, substantially 135°, substantially 225°, and substantially 315°" with the azimuth in the transverse direction of the pixels defined as 0° refer to the ranges up to an angle of 15°, preferably an angle of 5°, from the 45°, 135°, 225°, and 315° points in the clockwise or counterclockwise direction, respectively, with the azimuth in the transverse direction of the pixels defined as 0°.

The four alignment regions may include two alignment regions which provide tilt azimuths substantially 180° different from each other to the liquid crystal molecules and are arranged next to each other. With two alignment regions which provide tilt azimuths substantially 180° different from each other to the liquid crystal molecules and are arranged next to each other, the viewing angle characteristics can be made favorable. More preferably, the first substrate 30 may include the signal line 11 that crosses each pixel 10 in a transverse direction to divide the pixel 10 into two alignment division parts, and each pixel 10 may include two of the four alignment regions in at least one of the two alignment division parts formed by division with the signal line 11. In the two alignment regions included in the alignment division part, the tilt azimuths of the liquid crystal molecules may be substantially 180° different from each other. The "substantially 180°" means the range up to an angle of 15°, preferably an angle of 5°, from the 180° point in the clockwise or counterclockwise direction.

For reduction of the number of dark lines and enhancement of the viewing angle characteristics, each pixel may include, in the longitudinal direction of the pixels, the four alignment regions 10a, 10b, 10c, and 10d in an alignment division pattern (Pattern A) shown in FIG. 6(a) in which the fourth alignment region providing a tilt azimuth of substantially 315°, the second alignment region providing a tilt azimuth of substantially 135°, the third alignment region providing a tilt azimuth of substantially 225°, and the first alignment region providing a tilt azimuth of substantially 45° are arranged in the given order, or in an alignment division pattern (Pattern B) shown in FIG. 6(b) in which the third alignment region providing a tilt azimuth of substantially 225°, the first alignment region providing a tilt azimuth of substantially 45°, the fourth alignment region providing a tilt azimuth of substantially 315°, and the second alignment region providing a tilt azimuth of substantially 135° are arranged in the given order. In the case where the alignment division pattern is Pattern A, the signal line 11 may be arranged between the second alignment region and the third alignment region. In the case where the alignment division pattern is Pattern B, the signal line 11 may be arranged between the first alignment region and the fourth alignment region.

In the liquid crystal display panel of the present embodiment, the pixels in the row direction and the column direction may consecutively have only Pattern A or may consecutively have only Pattern B. The pixels in the row direction may consecutively have Pattern A or Pattern B and the pixels in the column direction may alternately have Pattern A and Pattern B. Moreover, in the liquid crystal display panel 100, the pixels 10 may include a first pixel and a second pixel arranged next to each other in the transverse direction, each pixel may include the first alignment region, the second alignment region, the third alignment region, and the fourth alignment region, and the first pixel and the second pixel may be the same as each other in terms of the arrangement order of the four alignment regions in the longitudinal direction of the pixels. In this case, alignment regions providing the same tilt azimuth to liquid crystal molecules are arranged in the row direction of the liquid crystal display panel, so that photo-alignment treatment by scanning exposure can be performed and thus the productivity is increased.

The pixel electrodes 31 may each include the first pixel electrode 31a configured to apply voltage to two alignment regions 10a and 10b arranged next to each other among the four alignment regions 10a, 10b, 10c, and 10d and the second pixel electrode 31b configured to apply voltage to the other two alignment regions 10c and 10d arranged next to each other, and the first pixel electrode 31a and the second pixel electrode 31b may be configured to apply different voltages to the liquid crystal layer 40.

Each pixel electrode 31 may be provided with slits 33 (notches or openings of the pixel electrode 31) which extend parallel to the respective tilt azimuths of the liquid crystal molecules 41. The slits 33 enables further stabilization of the tilt azimuths of the liquid crystal molecules 31 with voltage applied and enables reduction of the width of dark lines 120 generated. The slits 33 which extend parallel to the tilt azimuths of the liquid crystal molecules 41 are preferably completely parallel to the tilt azimuths, but may form an angle of 15° or smaller, for example. The slits 33 may be formed in a region between one pixel edge of each pixel 10 in the longitudinal direction and the center line of the pixel 10 in the transverse direction in each alignment region. Also, the slits 33 may be formed in regions superimposed on the respective alignment regions arranged next to each other in the longitudinal direction of each pixel 10 such that the slits 33 face each other across a boundary between the alignment regions arranged next to each other. The pixel electrodes 31 may each be provided with the slits (notches or openings of the pixel electrode 31) 33 which extend parallel to the respective tilt azimuths of the liquid crystal molecules 41, and the slits 33 may be formed in regions superimposed on the respective two alignment division parts and separated by a boundary between the two alignment division parts. The transmittance can be effectively increased by adjusting the positions of the slits 33 depending on the tilt azimuths of the liquid crystal molecules 41 in each alignment region and forming the slits 33 in a region corresponding to the region where the dark lines 20 are likely to be generated. The "center line in the transverse direction" means the line that is parallel to the longitudinal direction of the pixel 10 and passes the center point of the pixel 10 in the transverse direction.

Figure 7:
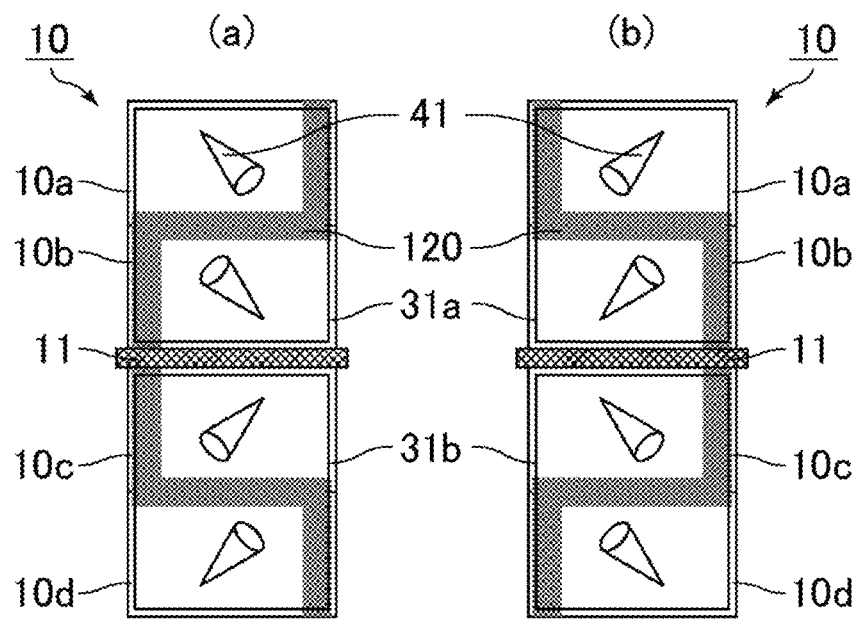
FIG. 7 shows schematic plan views of one pixel showing exemplary regions observed as dark lines in the liquid crystal display panel of the present invention.
Figure 8:
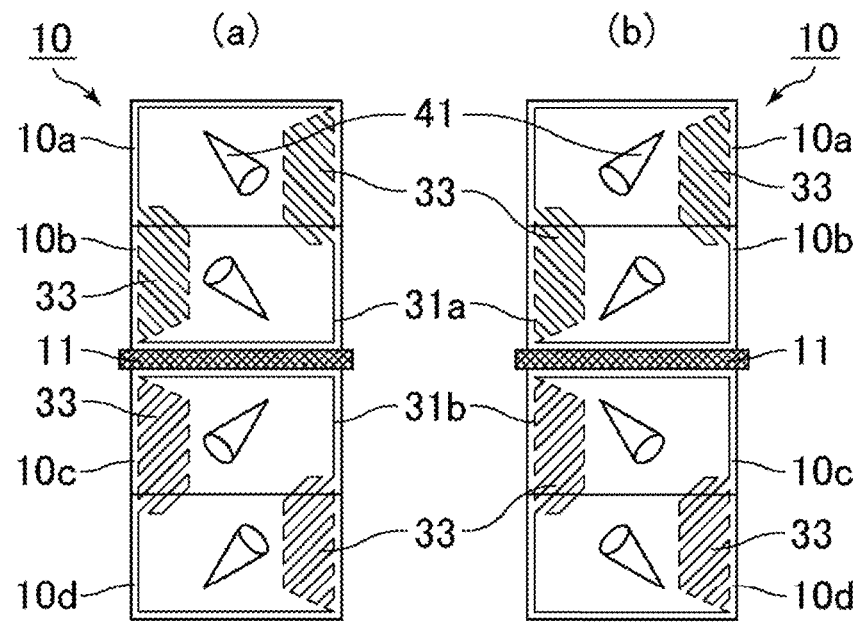
FIG. 8 shows schematic plan views of an exemplary pixel in the case where a pixel electrode in the liquid crystal display panel of the present invention is provided with slits.
Figure 9:
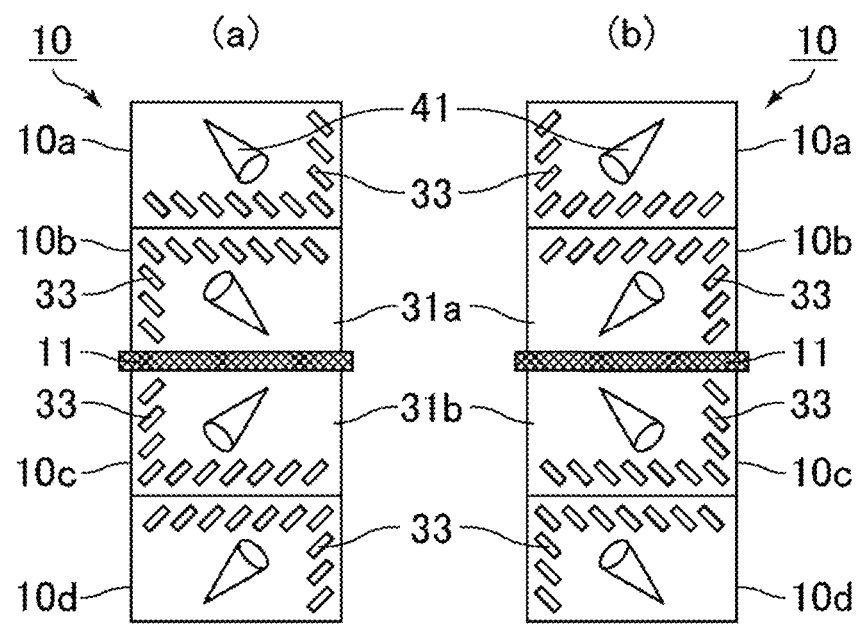
FIG. 9 shows schematic plan views of another exemplary pixel in the case where a pixel electrode in the liquid crystal display panel of the present invention is provided with slits.
Figure 10:
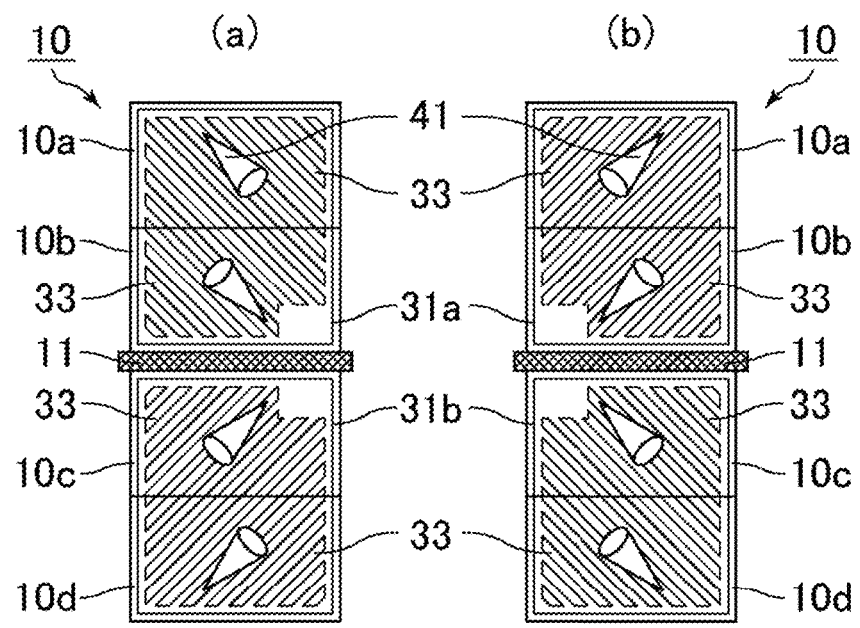
FIG. 10 shows schematic plan views of yet another exemplary pixel in the case where a pixel electrode in the liquid crystal display panel of the present invention is provided with slits.

FIG. 7 shows schematic plan views of one pixel showing exemplary regions observed as dark lines in the liquid crystal display panel of the present invention. FIG. 7(a) shows the case where the alignment division pattern is Pattern A. FIG. 7(b) shows the case where the alignment division pattern is Pattern B. The regions with irregular alignment of liquid crystal molecules do not transmit light and are therefore observed as dark lines. As shown in FIG. 7, the alignment of the liquid crystal molecules 41 is likely to be disturbed in the boundaries of pixels and boundaries of alignment regions, which are observed as the dark lines 120. FIG. 8 to FIG. 10 show schematic plan views of an exemplary pixel in the case where a pixel electrode in the liquid crystal display panel of the present invention is provided with slits.

FIG. 8(a), FIG. 9(a), and FIG. 10(a) are the cases where the alignment division pattern is Pattern A. FIG. 8(b), FIG. 9(b), and FIG. 10(b) are the cases where the alignment division pattern is Pattern B. As shown in FIG. 8, the slits 33 can be formed in a region between one pixel edge of each pixel 10 in the longitudinal direction and a center line of the pixel 10 in the transverse direction in each alignment region. The slits 33 may be formed in regions superimposed on the respective alignment regions arranged next to each other in the longitudinal direction of each pixel 10 such that the slits face each other across a boundary between the alignment regions arranged next to each other. Also, the slits may be formed in regions not superimposed on the signal lines 11 as shown in FIG. 9. The pixel electrodes 31 may also each be provided with the slits 33 which extend parallel to the respective tilt azimuths of the liquid crystal molecules, and the slits 33 may be formed in regions superimposed on the respective two alignment division parts and separated by a boundary between the two alignment division parts. Also, the pixel electrode 31 may include a portion with no slit near the signal lines 11 as shown in FIG. 10.

Figure 11:
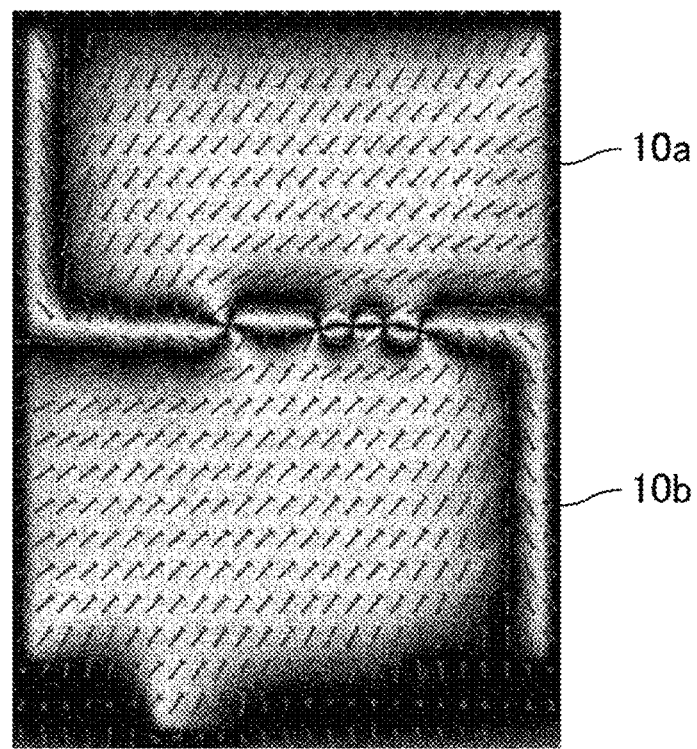
FIG. 11 is a photograph of a half pixel showing a simulation result of dark line generation in the case of FIG. 9.

The four alignment regions may each be superimposed on both a portion of the pixel electrode 31 provided with the slits 33 and a portion of the pixel electrode 31 provided with no slits 33. Also, the slits 33 of each pixel electrode 31 may be formed with ends thereof being spaced from at least one of the two sides of the corresponding pixel 10 in the transverse direction and the pixel electrodes 31 provided with slits may be connected to each other with a conductive electrode material. With the slits 33 arranged with a space from the edge of the pixel electrode 31 and the edges of the pixel electrode 33 connected with the electrode material, the alignment of liquid crystal molecules is stabilized, and the regions observed as dark lines can be fixed to the edge of the pixel 10. This configuration can also prevent breaking of the pixel electrodes 31 and thus increase the production yield. FIG. 11 is a photograph of a half pixel showing a simulation result of dark line generation in the case where the pixel electrode is provided with slits as shown in FIG. 9. FIG. 11 shows that although the alignment of the liquid crystal molecules is irregular in the boundary between the first alignment region 10a and the second alignment region 10b and near the outer edge of each half pixel so that dark lines are generated, the transmittance of each half pixel is high.

The pixel electrodes 31 may each be a transparent electrode and can be formed of, for example, a transparent conductive material such as indium tin oxide (ITO), indium zinc oxide (IZO), zinc oxide (ZnO), or tin oxide (SnO), or an alloy thereof.

The first vertical alignment film 70 and the second vertical alignment film 80 each have a function of controlling the alignment of the liquid crystal molecules 41 in the liquid crystal layer 40. When the voltage applied to the liquid crystal layer 40 is lower than the threshold voltage (including the case of no voltage application), the liquid crystal molecules are aligned in the direction substantially perpendicular to the first vertical alignment film 70 and the second vertical alignment film 80 and at a tilt in the respective tilt azimuth directions by the functions of the first vertical alignment film 70 and the second vertical alignment film 80. Specifically, the first vertical alignment film 70 can align the liquid crystal molecules at 85.0° to 89.0° relative to the first substrate 30, for example, while the second vertical alignment film 80 can align the liquid crystal molecules at 85.0° to 89.0° relative to the second substrate 50, for example.

The first vertical alignment film 70 and the second vertical alignment film 80 may be photo-alignment films formed of a photo-alignment material. The photo-alignment material encompasses general materials that undergo structural change when irradiated with light (electromagnetic waves) such as ultraviolet light or visible light, and thereby exhibit an ability of controlling the alignment of the nearby liquid crystal molecules (alignment controlling force) or change the alignment controlling force level and/or direction. Examples of the photo-alignment material include those containing a photo-reactive site which undergoes a reaction such as dimerization (formation of dimers), isomerization, photo-Fries rearrangement, or decomposition when irradiated with light. Examples of the photo-reactive site (functional group) which is dimerized and isomerized when irradiated with light include cinnamate, 4-chalcone, 4'-chalcone, coumarin, and stilbene. Examples of the photo-reactive site (functional group) which is isomerized when irradiated with light include azobenzene. Examples of the photo-reactive site which is photo-Fries rearranged when irradiated with light include phenolic ester structures. Examples of the photo-reactive site which is decomposed when irradiated with light include cyclobutane structures.

The first vertical alignment film 70 and the second vertical alignment film 80 may be photo-alignment films which, upon being subjected to photo-alignment treatment, provide a pre-tilt angle to the liquid crystal molecules. The photo-alignment treatment can be performed by irradiating the first substrate 30 provided with the first vertical alignment film 70 on a surface and the second substrate 50 provided with the second vertical alignment film 80 on a surface with light from a light source.

In a plan view of the liquid crystal display panel, the twist angle of the liquid crystal molecules is substantially 0° in each of the four alignment regions 10a, 10b, 10c, and 10d. In other words, liquid crystal molecules near the center of the liquid crystal layer in the thickness direction as well as liquid crystal molecules near the first vertical alignment film 70 and near the second vertical alignment film 80 are at the same tilt azimuth. That is, in a plan view of the liquid crystal display panel, in each of the four alignment regions 10a, 10b, 10c, and 10d, the first vertical alignment film 70 and the second vertical alignment film 80 provide pre-tilt azimuths in the opposite directions which are parallel to each other. The first vertical alignment film 70 and the second vertical alignment film 80 provide pre-tilt azimuths substantially 180° different from each other. For example, in the alignment region 10a, the first vertical alignment film 70 provides a pre-tilt azimuth of 315° and the second vertical alignment film 80 provides a pre-tilt azimuth of 135°. This configuration can differentiate the tilt azimuths of the liquid crystal molecules 41 in the four alignment regions 10a, 10b, 10c, and 10d. This configuration can also prevent a mark of pushing the liquid crystal display panel with a finger even in the case where each pixel electrode 31 is provided with slits. The pre-tilt azimuth provided by the first vertical alignment film 70 is the azimuth of the tilt of liquid crystal molecules from the first vertical alignment film 70 when no voltage is applied to the liquid crystal layer. The pre-tilt azimuth provided by the second vertical alignment film 80 is the azimuth of the tilt of liquid crystal molecules from the second vertical alignment film 80 when no voltage is applied to the liquid crystal layer. The expression "substantially 0°" means the range up to an angle of 15°, preferably an angle of 5°, from the 0° point in the clockwise or counterclockwise direction.

The second substrate 50 includes the counter electrode 51, and may be, for example, a color filter substrate (CF substrate). The color filter substrate can be one commonly used in the field of liquid crystal display panels.

The color filter substrate may have a configuration including, on a transparent substrate, components such as a black matrix formed in a grid pattern and color filters formed inside the grids, i.e., pixels. The black matrix may include a grid for each pixel such that the grid is superimposed on the boundaries of the pixels, and may also include a grid for each half pixel such that the grid crosses the center of the pixel in the transverse direction. A black matrix formed to be superimposed on dark line regions can reduce the chances of dark line observation. The counter electrode 51 is arranged to face the pixel electrodes 31 across the liquid crystal layer 40. Vertical electric fields are generated between the counter electrode 51 and the pixel electrodes 31, so that the liquid crystal molecules are tilted to provide display. Color filters may be arranged in the order of red (R), green (G), and blue (B), in the order of yellow (Y), red (R), green (G), and blue (B), or in the order of red (R), green (G), blue (B), and green (G) in each column, for example.

The counter electrode 51 is preferably a planar electrode. The counter electrode 51 may be a transparent electrode, and can be formed of, for example, a transparent conductive material such as indium tin oxide (ITO), indium zinc oxide (IZO), zinc oxide (ZnO), or tin oxide (SnO), or an alloy thereof.

A first polarizing plate 20 may be formed on or adjacent to the surface of the first substrate 30 opposite to the liquid crystal layer 40, and a second polarizing plate 60 may be formed on or adjacent to the surface of the second substrate 50 opposite to the liquid crystal layer 40. The polarization axis of the first polarizing plate 20 and the polarization axis of the second polarizing plate 60 may be perpendicular to each other. For example, the first polarizing plate 20 and the second polarizing plate 60 may be arranged such that one of the polarization axes is parallel to the long sides of the pixels 10 and the other polarization axis is perpendicular to the long sides of the pixels 10. Here, the polarization axis may be an absorption axis or a transmission axis of a polarizing plate. Typical examples of the first polarizing plate 20 and the second polarizing plate 60 include those obtained by adsorbing a dichroic anisotropic material such as an iodine complex on a polyvinyl alcohol (PVA) film and aligning the material. Typically, each surface of a PVA film is laminated with a protective film such as a triacetyl cellulose film for practical use. An optical film such as a retardation film may be arranged between the first polarizing plate 20 and the first substrate 30 or between the second polarizing plate 60 and the second substrate 50.

In the liquid crystal display panel 100 of the present embodiment, typically, the first substrate 30 and the second substrate 50 are bonded to each other by the sealing material 90 provided to surround the liquid crystal layer 40, so that the liquid crystal layer 40 is held in a predetermined region. The sealing material 90 may be, for example, an epoxy resin containing an inorganic or organic filler and a curing agent.

The liquid crystal display panel 100 of the present embodiment may be a liquid crystal display device including a backlight at the backside. A liquid crystal display device having such a configuration is typically called a transmissive liquid crystal display device. The backlight may be any backlight that emits light including only visible light or light including both visible light and ultraviolet light. In order to provide color display on the liquid crystal display device, a backlight emitting white light is suitable. Suitable kinds of the backlight include light emitting diodes (LEDs). The "visible light" as used herein means light (electromagnetic waves) having a wavelength of 380 nm or longer but shorter than 800 nm.

The liquid crystal display device has a configuration including, as well as the liquid crystal display panel and the backlight, multiple components including external circuits such as a tape-carrier package (TCP) and a printed circuit board (PCB); optical films such as a viewing angle-increasing film and a luminance-increasing film; and a bezel (frame). Some components, if appropriate, may be incorporated into another component. Components other than those described above are not particularly limited and are not described here because such components can be those commonly used in the field of liquid crystal display devices.

Another aspect of the present invention may be a method for manufacturing a liquid crystal display panel, including a photo-alignment treatment step of irradiating, with light from a light source through a polarizer, a first substrate provided with a first vertical alignment film on a surface and a second substrate provided with a second vertical alignment film on a surface, wherein the photo-alignment treatment step includes performing the light irradiation while moving the first substrate or the second substrate or moving the light source relative to the first substrate or the second substrate, the light irradiation direction for the first substrate or the second substrate is parallel to the moving direction of the first substrate or the second substrate or the moving direction of the light source, and a polarization axis of the polarizer is different from the light irradiation direction. The difference here is preferably 10° or greater, more preferably 15° or greater, still more preferably 30° or greater. The polarization axis of the polarizer and the light irradiation direction particularly preferably form an angle of substantially 45°. The expression "substantially 45°" means the range up to an angle of 15°, preferably an angle of 5°, from the 45° point in the clockwise or counterclockwise direction.

Figure 12:
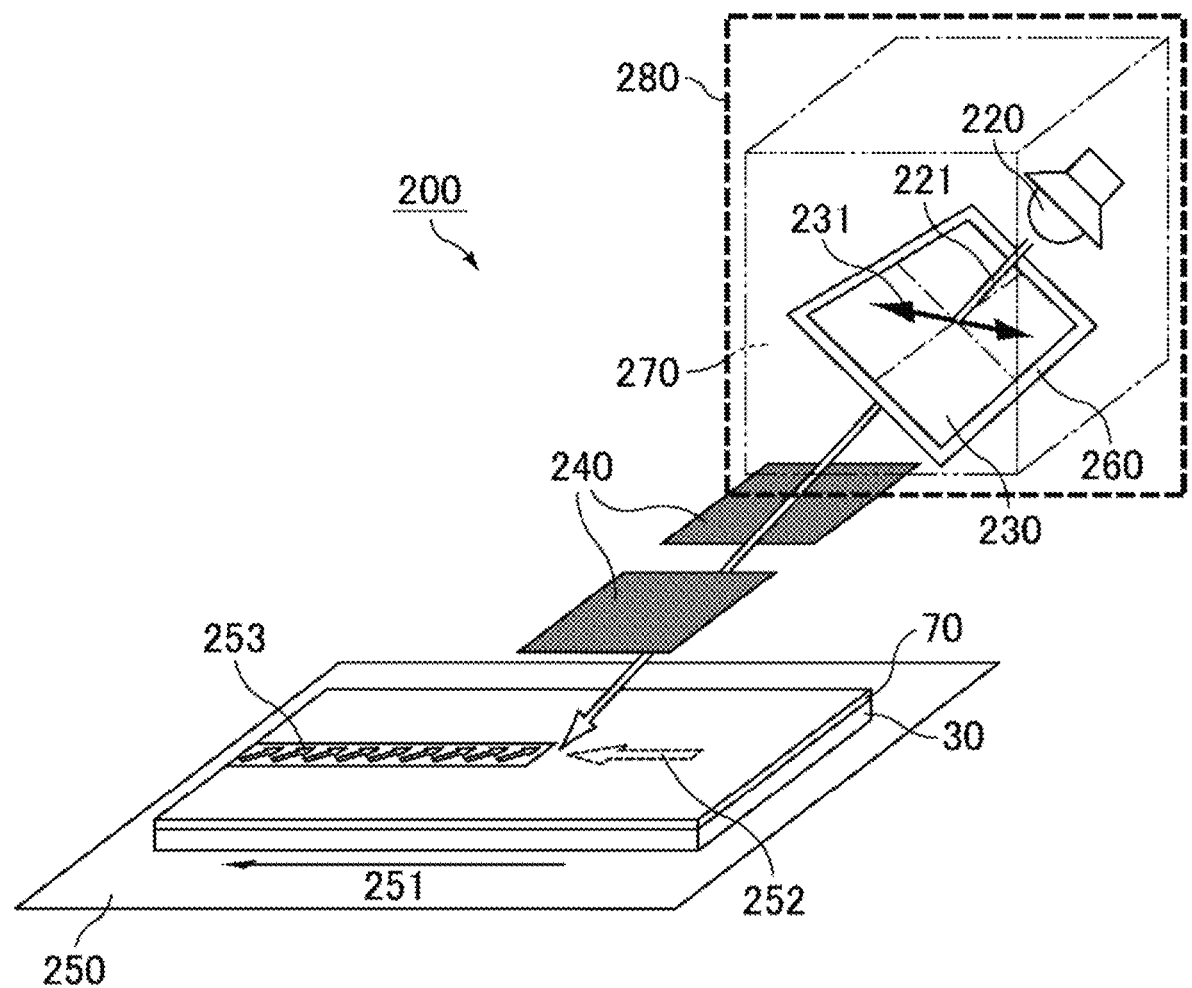
FIG. 12 is a schematic view illustrating an exemplary photo-alignment treatment method in the liquid crystal display panel of the present invention and an exemplary device for manufacturing the liquid crystal display panel of the present invention.

The case of performing photo-alignment treatment while moving the first substrate 30 is described with reference to FIG. 12. FIG. 12 is a schematic view illustrating an exemplary photo-alignment treatment method in the liquid crystal display panel of the present invention and an exemplary device 200 for manufacturing the liquid crystal display panel of the present invention. As shown in FIG. 12, the first substrate 30 provided with the first vertical alignment film 70 on a surface is irradiated with light 221 from a light source 220 through a polarizer 230 while the first substrate 30 is moved. At this time, portions that should not be irradiated with light are shielded from light by a light-shielding component 240. A light irradiation direction 252 for the first substrate 30 and a moving direction 251 of the first substrate 30 are parallel to each other, and a polarization axis 231 of the polarizer 230 and the light irradiation direction 252 form an angle of substantially 45°. Thereby, the first vertical alignment film 70 can provide a pre-tilt azimuth 253. By rotating the polarization axis of the polarizer by 90° while changing the portions shielded from light, regions providing different pre-tilt azimuths can be formed. The light irradiation direction 252 is the light travelling direction in the case where the light 221 emitted by the light source 220 is projected on a surface of the first substrate 30 or a surface of the second substrate 50 as shown in FIG. 12.

Figure 13:
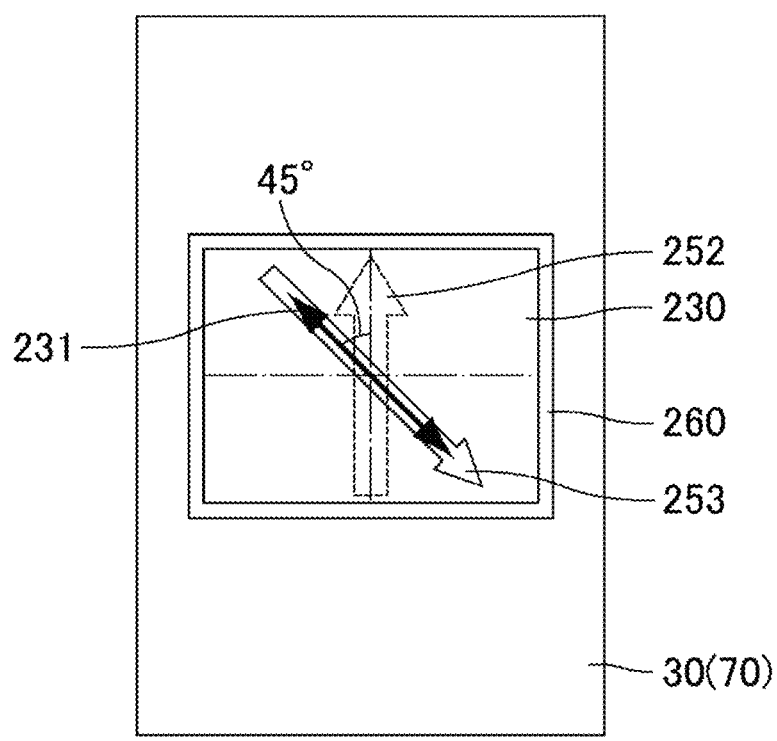
FIG. 13 is a schematic plan view of a polarization axis of a polarizer projected on a surface of a substrate in the photo-alignment treatment method and the manufacturing device shown in FIG. 12.

FIG. 13 is a schematic plan view of a polarization axis of a polarizer projected on a surface of a substrate in the photo-alignment treatment method and the manufacturing device shown in FIG. 12. As shown in FIG. 13, the polarization axis 231 of the polarizer 230 projected on a surface of the first substrate 30 or a surface of the second substrate 50 is preferably at the same azimuth as the pre-tilt azimuth 253. Thereby, liquid crystal molecules can be aligned at the desired azimuth. Also, the polarization axis 231 of the polarizer 230 projected on a surface of the first substrate 30 or a surface of the second substrate 50 and the light irradiation direction 252 may form an angle of substantially 45°. Thereby, four alignment regions providing different tilt azimuths to liquid crystal molecules can be formed in each pixel with higher precision.

The light 221 can be light (electromagnetic waves) such as ultraviolet light or visible light, preferably light having a wavelength of 300 nm to 400 nm. The photo-alignment treatment can be performed by, for example, a device having a light source for irradiating the alignment film 70 with light and a function of conducting continuous scanning exposure for multiple pixels. Specific modes of the scanning exposure include a mode of irradiating a substrate surface with light from a light source while moving the substrate; a mode of irradiating a substrate surface with light from a light source while moving the light source; and a mode of irradiating substrate surface with light from a light source while moving the light source and the substrate.

Another aspect of the present invention may be a device for manufacturing a liquid crystal display panel, including a mechanism 280 configured to irradiate, with light from the light source 220 through the polarizer 230, the first substrate 30 provided with the first vertical alignment film 70 on a surface and the second substrate 50 provided with the second vertical alignment film 80 on a surface, wherein the first vertical alignment film 70 and the second vertical alignment film 80 are photo-alignment films which, upon being subjected to photo-alignment treatment, provide a pre-tilt angle to the liquid crystal molecules as shown in FIG. 12, the mechanism 280 is configured to perform the light irradiation while moving the first substrate 30 or the second substrate 50 or moving the light source 220 relative to the first substrate 30 or the second substrate 50, the light irradiation direction 252 for the first substrate 30 or the second substrate 50 is parallel to the moving direction 251 of the first substrate 30 or the second substrate 50 or the moving direction 252 of the light source, and the polarization axis 231 of the polarizer 230 is different from the light irradiation direction 252. The polarization axis of the polarizer and the light irradiation direction preferably form an angle of substantially 45°.

In the photo-alignment treatment step performed by the device 200 for manufacturing a liquid crystal display panel, the polarization axis 231 of the polarizer 230 and the light irradiation direction 252 are different from each other. Also, with the polarization axis 231 of the polarizer 230 and the light irradiation direction 252 forming an angle of substantially 45°, four alignment regions providing different tilt azimuths to the liquid crystal molecules can be formed in each pixel while the moving direction of the substrate and the irradiation direction by the light source are kept parallel to each other. The device 200 for manufacturing a liquid crystal display panel therefore can perform the photo-alignment treatment step by scanning exposure, which is highly productive, on the first substrate and the second substrate. The polarization axis 231 of the polarizer 230 projected on a surface of the first substrate 30 or a surface of the second substrate 50 and the light irradiation direction 252 may form an angle of substantially 45°.

The mechanism (hereinafter, also referred to as a light irradiation mechanism) 280 configured to perform irradiation with light from the light source 220 through the polarizer 230 includes the light source 220 and the polarizer 230 in a lamp box 270. The light source 220 and the polarizer 230 are fixed such that the polarization axis 231 of the polarizer 230 and the light irradiation direction 252 form an angle of substantially 45°, for example.

The device may also include a mechanism 260 configured to rotate the polarizer 230. The mechanism 260 configured to rotate the polarizer 230 can rotate the polarization axis of the polarizer 230 about the light irradiation direction by 90°. For example, in the case where one of the four alignment regions is subjected to first light irradiation where the moving direction of the substrate is set to a first direction and the light irradiation direction to a second direction and then another alignment region is subjected to second light irradiation where the moving direction of the substrate is set to the first direction and the light irradiation direction to the second direction, the mechanism 260 configured to rotate the polarizer 230 can be used to rotate the polarization axis 231 of the polarizer 230 by 90°. Here, the first direction and the second direction are parallel to each other.

The device may include one or a plurality of the light irradiation mechanisms 280. A device including one light irradiation mechanism 280 performs light irradiation by utilizing the mechanism 260 configured to rotate the polarizer 230 to rotate the polarization axis 231 of the polarizer 230 by 90° for each of the four alignment regions, so as to form the four alignment regions providing different tilt azimuths to liquid crystal molecules. A device including a plurality of the light irradiation mechanisms 280 performs light irradiation by utilizing a first light irradiation mechanism 280A to fix the polarization axis 231 of the polarizer 230 and the light irradiation direction 252 to form an angle of substantially 45° and utilizing a second light irradiation mechanism 280B to fix the polarizer 230 at a position rotated by 90° from the polarization axis 231 fixed by the first light irradiation mechanism 280A, for example, so as to form the four alignment regions providing different tilt azimuths to liquid crystal molecules. The device 200 for manufacturing a liquid crystal display panel can exhibit enhanced productivity in the case of including a plurality of the light irradiation mechanisms 280.

The device 200 for manufacturing a liquid crystal display panel may include, for example, the light-shielding component 240 and a substrate-transporting stage 250 as well as the above mechanisms. By fixing the first substrate 30 or the second substrate 50 on the substrate-transporting stage 250, the first substrate 30 or the second substrate 50 can be moved parallel to the light irradiation direction 252 for the first substrate 30 or the second substrate 50.

Hereinabove, an embodiment of the present invention has been described. Each and every detail described for the above embodiment of the present invention should be applied to all the aspects of the present invention.

The present invention is described in more detail below based on examples and comparative examples. The present invention, however, is not limited to these examples.

Example 1

In Example 1, a liquid crystal display panel was produced which had an alignment division pattern in which the four alignment regions were arranged in the order of regions providing tilt azimuths of substantially 315°, substantially 135°, substantially 215°, and substantially 45°, with the azimuth in the transverse direction of the pixels defined as 0°.

First, a TFT substrate including components such as TFTs, pixel electrodes, and signal lines and a CF substrate including components such as a black matrix, color filters, and a counter electrode were prepared. The pixel electrodes used were those provided with slits as shown in FIG. 8(a). An alignment film solution was applied to the surface of each of the TFT substrate and the CF substrate, and the substrates were heated at 80° C. or lower, followed by heating at 230° C. for post-baking. Thereby, vertical alignment films were formed. The solids components in the alignment film solution were a polymer material mainly having a polysiloxane structure with a cinnamate group functioning as a photo functional group in a side chain and polyamic acid. Such vertical alignment films can also be produced by, for example, applying an alignment film solution containing polyamic acid as its solids component to the surface of each of the TFT substrate and the CF substrate, heating the substrates at 80° C. or lower, and heating the substrates at 200° C. for post-baking.

Using a device for manufacturing a liquid crystal display panel including a mechanism (light irradiation mechanism) configured to irradiate a substrate with light from a light source through a polarizer, photo-alignment treatment was performed on the TFT substrate and the CF substrate on which the respective vertical alignment films were formed. The photo-alignment treatment was performed by scanning exposure of the substrates to linearly polarized light having a dominant wavelength of 313 nm with an intensity of 20 mJ/cm$^2$.

FIG. 14 is a view illustrating an exemplary photo-alignment treatment step for a TFT substrate in a liquid crystal display panel of Example 1. As shown in FIG. 14, first light irradiation was performed where the moving direction 251 of the TFT substrate was set to the first direction and the light irradiation direction 252 to the second direction. The first direction and the second direction were parallel to each other. The polarizer 230 was arranged such that its polarization axis 231 formed an angle of substantially 45° with the light irradiation direction 252. Portions that should not be irradiated with light were shielded from light with a light-shielding component. The light-shielding component was then shifted and the polarization axis 231 of the polarizer 230 was rotated by 90° so that second light irradiation was performed where the moving direction 251 of the TFT substrate was set to the first direction and the light irradiation direction 252 to the second direction. The light-shielding component was further shifted and the polarization axis 231 of the polarizer 230 was rotated by 90° so that third light irradiation was performed where the moving direction 251 of the TFT substrate was set to the second direction and the light irradiation direction 252 to the first direction. Finally, the light-shielding component was further shifted and the polarization axis 231 of the polarizer 230 was rotated by 90° so that fourth light irradiation was performed where the moving direction 251 of the TFT substrate was set to the second direction and the light irradiation direction 252 to the first direction. The TFT substrate subjected to the light irradiation step provides different pre-tilt azimuths 253 in the respective four alignment regions.

FIG. 15 is a view illustrating an exemplary photo-alignment treatment step for a CF substrate in the liquid crystal display panel of Example 1. As shown in FIG. 15, first light irradiation was performed where the moving direction 251 of the CF substrate was set to the second direction and the light irradiation direction 252 to the first direction. The polarizer 230 was arranged such that its polarization axis 231 formed an angle of substantially 45° with the light irradiation direction 252. Portions that should not be irradiated with light were shielded from light with a light-shielding component. The light-shielding component was then shifted and the polarization axis 231 of the polarizer 230 was rotated by 90° so that second light irradiation was performed where the moving direction 251 of the CF substrate was set to the second direction and the light irradiation direction 252 to the first direction. The light-shielding component was further shifted and the polarization axis 231 of the polarizer 230 was rotated by 90° so that third light irradiation was performed where the moving direction 251 of the CF substrate was set to the first direction and the light irradiation direction 252 to the second direction. Finally, the light-shielding component was further shifted and the polarization axis 231 of the polarizer 230 was rotated by 90° so that fourth light irradiation was performed where the moving direction 251 of the CF substrate was set to the first direction and the light irradiation direction 252 to the second direction. The CF substrate subjected to the light irradiation step provides different pre-tilt azimuths 253 in the respective four alignment regions.

Figure 16:
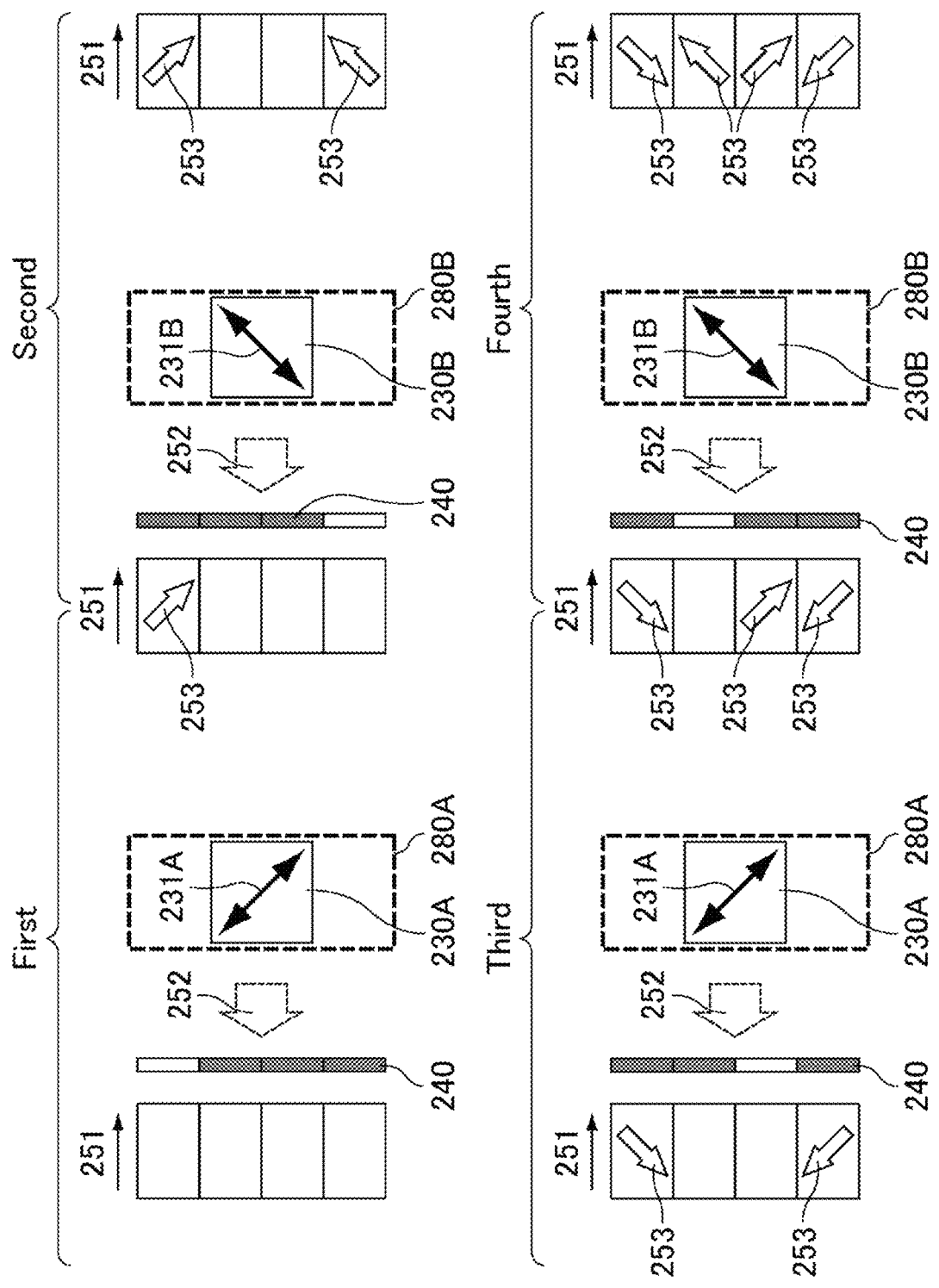
FIG. 16 is a view illustrating another exemplary photo-alignment treatment step for the TFT substrate in the liquid crystal display panel of Example 1.

Although a device for manufacturing a liquid crystal display panel which includes one light irradiation mechanism was used in the cases of FIG. 14 and FIG. 15, a device for manufacturing a liquid crystal display panel which includes a plurality of light irradiation mechanisms may be used. The following describes the case of using a device for manufacturing a liquid crystal display panel which includes the first light irradiation mechanism 280A and the second light irradiation mechanism 280B to perform the photo-alignment treatment step for the TFT substrate. FIG. 16 is a view illustrating another exemplary photo-alignment treatment step for the TFT substrate in the liquid crystal display panel of Example 1. A polarizer 230A on the first light irradiation mechanism 280A and a polarizer 230B on the second light irradiation mechanism 280B are arranged such that a polarization axis 231A of the polarizer 230A and a polarization axis 231B of the polarizer 230B form an angle of substantially 45° with the light irradiation direction 252 and are 90° different from each other. As shown in FIG. 16, first light irradiation where the moving direction 251 of the TFT substrate is set to the first direction and the light irradiation direction 252 to the second direction is performed by the first light irradiation mechanism 280A. The first direction and the second direction are parallel to each other. Portions that should not be irradiated with light are shielded from light with the light-shielding component 240. The light-shielding component 240 is then shifted so that second light irradiation is performed by the second light irradiation mechanism 280B. The substrate is rotated by 180° and the light-shielding component 240 is further shifted so that third light irradiation is performed by the first light irradiation mechanism 280A. Finally, the light-shielding component 240 is further shifted so that fourth light irradiation is performed by the second light irradiation mechanism 280B. The moving direction 251 of the TFT substrate and the light irradiation direction 252 are the same in all the first to fourth light irradiation treatments. The TFT substrate subjected to the light irradiation step provides different pre-tilt azimuths 253 in the respective four alignment regions. This device including the first light irradiation mechanism 280A and the second light irradiation mechanism 280B can perform light irradiation with the polarization axis of the polarizer fixed, thereby exhibiting increased productivity. Although another exemplary photo-alignment treatment step for the TFT substrate was described with reference to FIG. 16, the photo-alignment treatment step can be performed on the CF substrate with the device for manufacturing a liquid crystal display panel which includes a plurality of light irradiation mechanisms in the same manner. Also in the light irradiation step, a device for manufacturing a liquid crystal display panel which includes four light irradiation mechanisms can be used to perform light irradiation for the four alignment regions with the respective different light irradiation mechanisms.

A liquid crystal composition containing liquid crystal molecules was dropped onto the TFT substrate. Lines of a heat/visible light-curable sealing material were drawn on the CF substrate using a dispenser. The TFT substrate and the CF substrate were then bonded to each other such that the pre-tilt azimuths provided by the vertical alignment film formed on the surface of the TFT substrate and the pre-tilt azimuths provided by the vertical alignment film formed on the surface of the CF substrate were in opposite directions and parallel to each other. Between the substrates was sealed the liquid crystal composition. In a plan view of the resulting liquid crystal display panel, the twist angle of the liquid crystal molecules is substantially 0° in each of the four alignment regions.

To the back surface (surface on which light from the backlight is incident) of the TFT substrate and the viewing surface (surface from which the light from the backlight is emitted) of the CF substrate were attached paired polarizing plates such that the polarization axes were in crossed Nicols, whereby the liquid crystal display panel of Example 1 was completed. The polarizing plates were arranged such that the polarization axis of one of the plates was parallel to the long sides of the pixels and the polarization axis of the other plate was perpendicular to the long sides of the pixels.

A backlight including white LEDs was bonded to the back surface of the liquid crystal display panel, so that a liquid crystal display device was produced.

Figure 17:
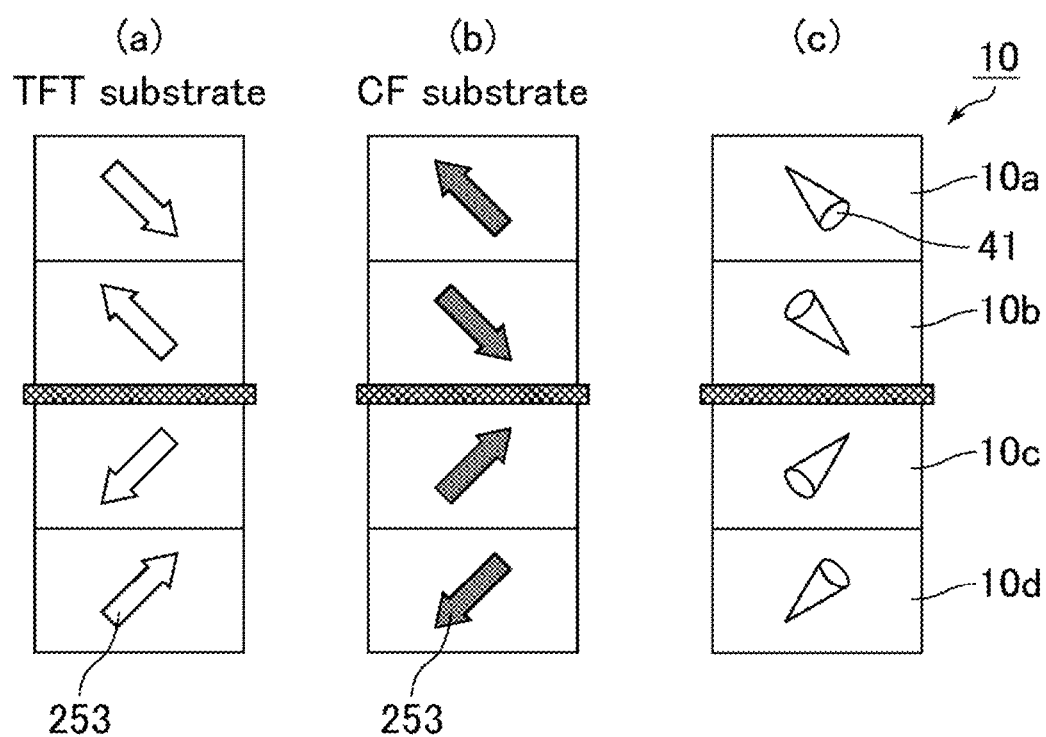
FIG. 17 shows schematic plan views illustrating pre-tilt azimuths provided by the TFT substrate and the CF substrate and tilt azimuths of liquid crystal molecules in the liquid crystal display panel of Example 1.

FIG. 17 shows schematic plan views illustrating pre-tilt azimuths provided by the TFT substrate and the CF substrate and tilt azimuths of liquid crystal molecules in the liquid crystal display panel of Example 1. FIG. 17(a) shows the pre-tilt azimuths provided by the TFT substrate. FIG. 17(b) shows the pre-tilt azimuths provided by the CF substrate. FIG. 17(c) shows the tilt azimuths of liquid crystal molecules in the respective alignment regions when voltage is applied. As shown in FIG. 17(a) and FIG. 17(b), in a plan view of the liquid crystal display panel, the pre-tilt azimuth 253 provided by the vertical alignment film formed on the surface of the TFT substrate and the pre-tilt azimuth 253 provided by the vertical alignment film formed on the surface of the CF substrate are in opposite directions and parallel to each other in each of the four alignment regions 10a, 10b, 10c and 10d. Hence, in a plan view of the liquid crystal display panel, the twist angle of the liquid crystal molecules in each of the four alignment regions is substantially 0°. As shown in FIG. 17(c), the pixel 10 in Example 1 has the alignment division pattern in which a fourth alignment region providing a tilt azimuth of substantially 315°, a second alignment region providing a tilt azimuth of substantially 135°, a third alignment region providing a tilt azimuth of substantially 225°, and a first alignment region providing a tilt azimuth of substantially 45°, to the liquid crystal molecules 41 are arranged in the given order with the azimuth in the transverse direction of the pixels defined as 0°. In Example 1, a liquid crystal display panel was produced in which pixels having the same alignment pattern were arranged both in the row direction and the column direction.

Figure 18:
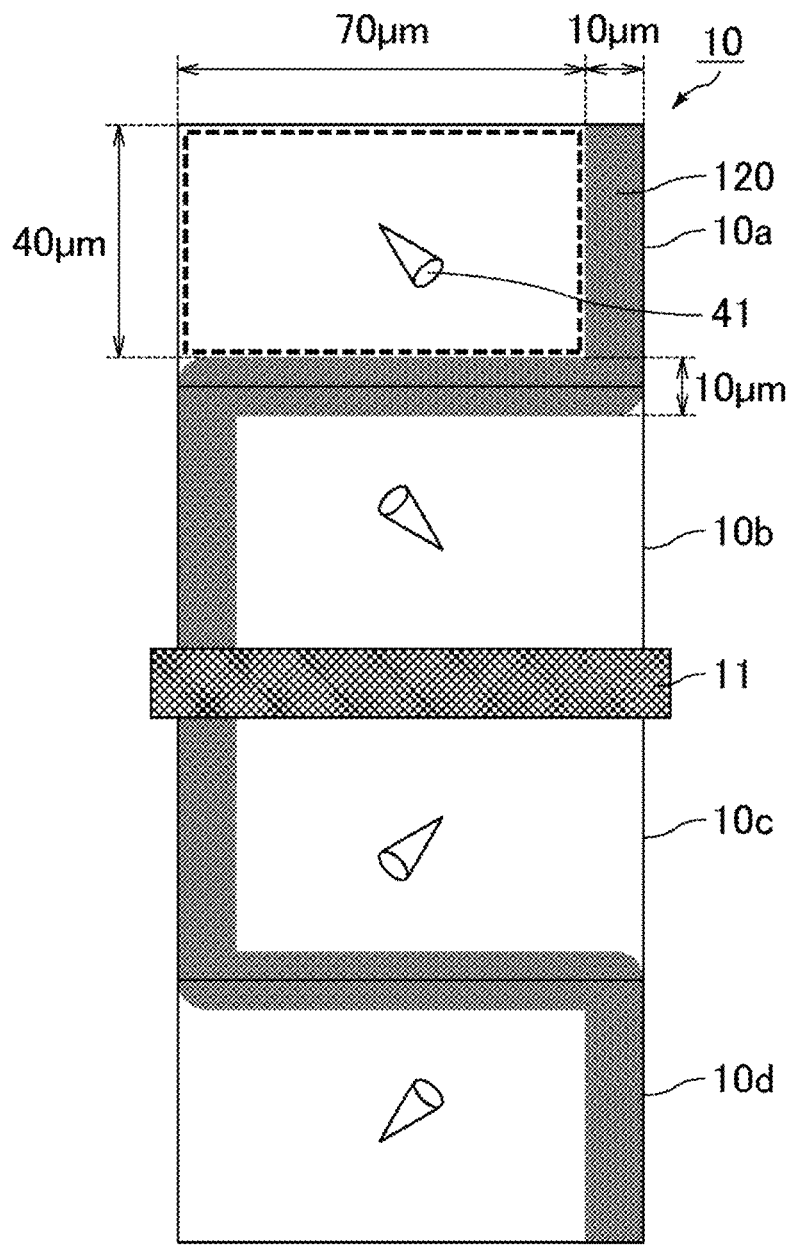
FIG. 18 is a schematic plan view of a pixel showing regions observed as dark lines in the liquid crystal display panel of Example 1.
Figure 19:
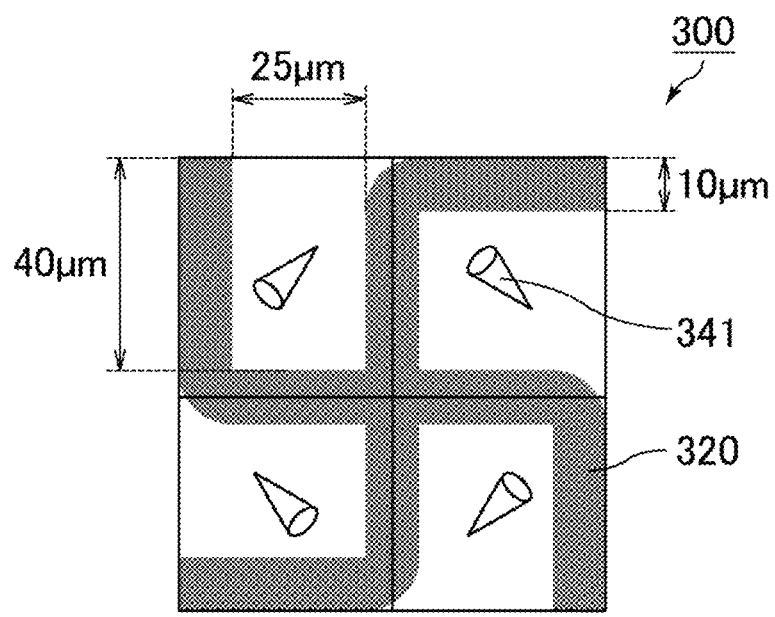
FIG. 19 is a schematic plan view of a half pixel showing exemplary regions observed as dark lines in a first conventional 4D-RTN mode liquid crystal display panel.
Figure 20:
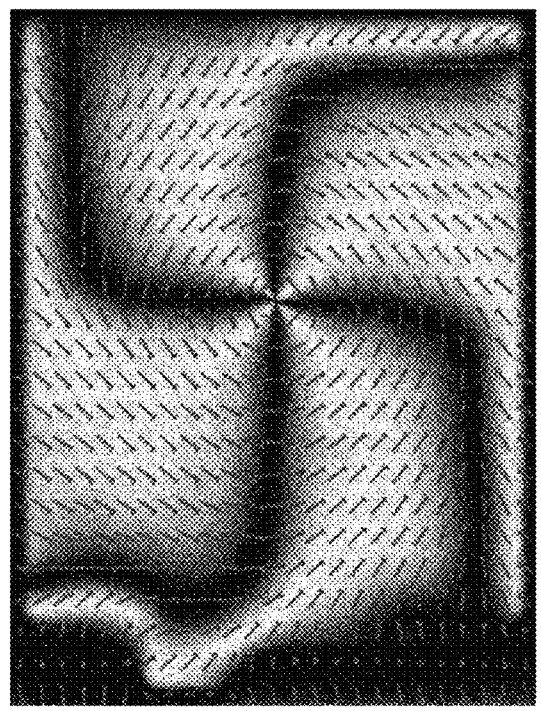
FIG. 20 is a photograph of a half pixel showing a simulation result of dark line generation in the first conventional 4D-RTN mode liquid crystal display panel.

FIG. 18 is a schematic plan view of a pixel showing regions observed as dark lines in the liquid crystal display panel of Example 1. The width of the dark lines 120 is about 10 μm, and a region with no dark line is surrounded by a dotted line. In Example 1, dark line generation was reduced, so that the proportion of the region with no dark line was high in one pixel and thus the transmittance in one pixel was high.

Figure 23:
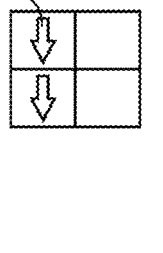
FIG. 23 is a view illustrating an exemplary photo-alignment treatment step for a TFT substrate in the first conventional 4D-RTN mode liquid crystal display panel.
Figure 24:
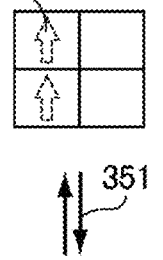
FIG. 24 is a view illustrating an exemplary photo-alignment treatment step for a CF substrate in the first conventional 4D-RTN mode liquid crystal display panel.
Figures 25, 26:
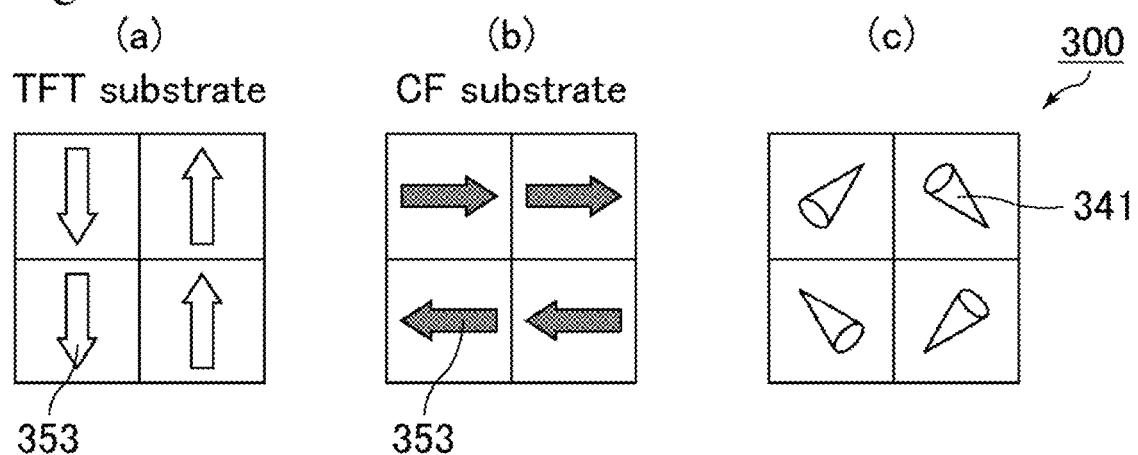
FIG. 25 shows schematic plan views illustrating exemplary pre-tilt azimuths provided by the TFT substrate and the CF substrate and exemplary tilt azimuths of liquid crystal molecules in the first conventional 4D-RTN mode liquid crystal display panel.
FIG. 26 is a view illustrating an exemplary photo-alignment treatment step for a TFT substrate in the second conventional 4D-RTN mode liquid crystal display panel.
Figure 29:
FIG. 29 is a view illustrating an exemplary photo-alignment treatment step for a TFT substrate in a conventional 4D-ECB mode liquid crystal display panel.

For reference, the following describes an exemplary method for manufacturing the conventional 4D-RTN mode liquid crystal display panel 300 with reference to FIG. 23 to FIG. 25, an exemplary method for manufacturing the other conventional 4D-RTN mode liquid crystal display panel 400 with reference to FIG. 26 to FIG. 28, and an exemplary method for manufacturing the conventional 4D-ECB mode liquid crystal display panel 500 with reference to FIG. 29 and FIG. 30.

As shown in FIG. 23, in the photo-alignment treatment for the TFT substrate of the conventional 4D-RTN mode liquid crystal display panel 300, the right half of a half pixel is shielded from light and first light irradiation is performed on the left half of the half pixel by setting the moving direction 351 of the TFT substrate or the light source to the vertical direction of the pixel and setting the light irradiation direction 352 to be parallel to the moving direction 351 of the TFT substrate or the light source. Then, the left half of the half pixel is shielded from light and second light irradiation is performed on the right half of the half pixel by setting the moving direction 351 of the TFT substrate or the light source and the light irradiation direction 352 to be opposite to the respective directions in the first light irradiation. In the alignment treatment for the CF substrate, as shown in FIG. 23, the lower half of the half pixel is shielded from light and first light irradiation is performed on the upper half of the half pixel by setting the moving direction 351 of the CF substrate or the light source to the horizontal direction of the pixel and setting the light irradiation direction 352 to be parallel to the moving direction 351 of the TFT substrate or the light source. The upper half of the half pixel is then shielded from light and second light irradiation is performed on the lower half of the half pixel by setting the moving direction 351 of the TFT substrate or the light source and the light irradiation direction 352 to be opposite to the respective directions in the first light irradiation.

FIG. 25 shows schematic plan views illustrating pre-tilt azimuths provided by the TFT substrate and the CF substrate and tilt azimuths of liquid crystal molecules in the conventional 4D-RTN mode liquid crystal display panel 300. FIG. 25(a) shows the pre-tilt azimuths provided by the TFT substrate. FIG. 25(b) shows the pre-tilt azimuths provided by the CF substrate. FIG. 25(c) shows the tilt azimuths of the liquid crystal molecules 341 in the respective alignment regions when voltage is applied. As shown in FIG. 25(a) and FIG. 25(b), in a plan view of the liquid crystal display panel, pre-tilt azimuths 353 provided by the TFT substrate are different between the left and right halves of the half pixel while the pre-tilt azimuths provided by the CF substrate are different between the upper and lower halves of the half pixel. When the TFT substrate and the CF substrate are bonded to each other, the pre-tilt azimuth 353 provided by the TFT substrate is perpendicular to the pre-tilt azimuth 353 provided by the CF substrate in each alignment region. As shown in FIG. 25(c), in the conventional 4D-RTN mode, each half pixel is divided into four alignment regions and the tilt azimuths of liquid crystal molecules are different in the respective alignment regions.

As shown in FIG. 26, in the alignment treatment for the TFT substrate of the second conventional 4D-RTN mode liquid crystal display panel 400, the lower half of a half pixel is shielded from light and first light irradiation is performed on the upper half of the half pixel by setting a moving direction 451 of the TFT substrate or the light source to the horizontal direction of the pixel and a light irradiation direction 452 to the vertical direction of the pixel. Then, the upper half of the half pixel is shielded from light and second light irradiation is performed on the lower half of the half pixel by setting the moving direction 451 of the TFT substrate or the light source and the light irradiation direction 452 to be opposite to the respective directions in the first light irradiation. In the alignment treatment for the CF substrate, as shown in FIG. 27, the right half of the half pixel is shielded from light and first light irradiation is performed on the left half of the half pixel by setting the moving direction 451 of the CF substrate or the light source to the vertical direction of the pixel and the light irradiation direction 452 to the horizontal direction of the pixel. Then, the left half of the half pixel is shielded from light and second light irradiation is performed on the right half of the half pixel by setting the moving direction 451 of the CF substrate or the light source and the light irradiation direction 452 to be opposite to the respective directions in the first light irradiation.

FIG. 28 shows schematic plan views illustrating another exemplary pre-tilt azimuths provided by the TFT substrate and the CF substrate and exemplary tilt azimuths of liquid crystal molecules in the second conventional 4D-RTN mode liquid crystal display panel 400. FIG. 28(a) shows the pre-tilt azimuths provided by the TFT substrate. FIG. 28(b) shows the pre-tilt azimuths provided by the CF substrate. FIG. 28(c) shows tilt azimuths of the liquid crystal molecules 441 in the respective alignment regions when voltage is applied. As shown in FIG. 28(a) and FIG. 28(b), in a plan view of the liquid crystal display panel, pre-tilt azimuths 453 provided by the TFT substrate are different between the upper and lower halves of the half pixel while the pre-tilt azimuths provided by the CF substrate are different between the left and right halves of the half pixel. When the TFT substrate and the CF substrate are bonded to each other, the pre-tilt azimuth 453 provided by the TFT substrate is perpendicular to the pre-tilt azimuth 453 provided by the CF substrate in each alignment region. As shown in FIG. 28(c), in the second conventional 4D-RTN mode, each half pixel is divided into four alignment regions and the liquid crystal molecules in each alignment region are aligned by electric fields generated by the slits 431 formed in the pixel electrode when voltage is applied.

FIG. 29 and FIG. 30 are views illustrating an exemplary photo-alignment treatment step in the conventional 4D-ECB mode liquid crystal display panel 500. FIG. 29 shows a photo-alignment treatment step for the TFT substrate. FIG. 30 shows a photo-alignment treatment step for the CF substrate. As shown in FIG. 29, in the alignment treatment for the TFT substrate, regions other than the upper left region among four regions of a half pixel are shielded from light and first light irradiation is performed on the upper left region of the half pixel by setting a light irradiation direction 552 to the direction from the center of the half pixel toward the outside. Then, second light irradiation is performed on the upper right region of the half pixel, third light irradiation is performed on the lower left region of the half pixel, and fourth light irradiation is performed on the lower right region of the half pixel, all by setting the light irradiation direction 552 to the direction from the center of the half pixel toward the outside as in the first light irradiation. In the alignment treatment for the CF substrate, as shown in FIG. 30, regions other than the upper left region among four regions of a half pixel are shielded from light and first light irradiation is performed on the upper left region of the half pixel by setting the light irradiation direction 552 to the direction from the outside of the half pixel toward the center. Then, second light irradiation is performed on the upper right region of the half pixel, third light irradiation is performed on the lower left region of the half pixel, and fourth light irradiation is performed on the lower right region of the half pixel, all by setting the light irradiation direction 352 to the direction from the outside of the half pixel toward the center as in the first light irradiation.

Additional Remarks

One aspect of the present invention may be a liquid crystal display panel including in the following order: a first substrate including pixel electrodes; a first vertical alignment film; a liquid crystal layer containing liquid crystal molecules; a second vertical alignment film; and a second substrate including a counter electrode, the liquid crystal display panel including pixels each including four alignment regions which provide different tilt azimuths to the liquid crystal molecules and are arranged in a longitudinal direction of each pixel, with the azimuth in a transverse direction of each pixel defined as 0°, the pixels each including a first alignment region providing a tilt azimuth of substantially 45°, a second alignment region providing a tilt azimuth of substantially 135°, a third alignment region providing a tilt azimuth of substantially 225°, and a fourth alignment region providing a tilt azimuth of substantially 315°, the liquid crystal molecules being aligned in a direction substantially perpendicular to the first vertical alignment film and the second vertical alignment film and at a tilt in the respective tilt azimuth directions with no voltage applied to the liquid crystal layer and being to be more tilted in the respective tilt azimuth directions upon application of voltage to the liquid crystal layer, the liquid crystal molecules being at a twist angle of substantially 0° in each of the four alignment regions in a plan view of the liquid crystal display panel.

The first vertical alignment film and the second vertical alignment film may be photo-alignment films which, upon being subjected to photo-alignment treatment, provide a pre-tilt angle to the liquid crystal molecules.

The four alignment regions may include two alignment regions which provide tilt azimuths substantially 180° different from each other to the liquid crystal molecules and are arranged next to each other.

The four alignment regions may be arranged in the order of the fourth alignment region, the second alignment region, the third alignment region, and the first alignment region. Also, the four alignment regions may be arranged in the order of the third alignment region, the first alignment region, the fourth alignment region, and the second alignment region.

The first substrate may include a signal line that crosses each pixel in a transverse direction to divide the pixel into two alignment division parts, and each pixel may include two of the four alignment regions in at least one of the two alignment division parts formed by division with the signal line.

The pixel electrodes may each be provided with slits which extend parallel to the respective tilt azimuths of the liquid crystal molecules, and the slits may be formed in regions superimposed on the respective two alignment division parts and separated by a boundary between the two alignment division parts.

The two alignment regions included in the at least one alignment division part may provide tilt azimuths substantially 180° different from each other to the liquid crystal molecules.

The four alignment regions may be arranged in the order of the fourth alignment region, the second alignment region, the third alignment region, and the first alignment region, and the signal line may be arranged between the second alignment region and the third alignment region. Also, the four alignment regions may be arranged in the order of the third alignment region, the first alignment region, the fourth alignment region, and the second alignment region, and the signal line may be arranged between the first alignment region and the fourth alignment region.

The pixels may include a first pixel and a second pixel arranged next to each other in the transverse direction, each pixel may include the first alignment region, the second alignment region, the third alignment region, and the fourth alignment region, and the first pixel and the second pixel may be the same as each other in terms of the arrangement order of the four alignment regions in the longitudinal direction of the pixels.

Each pixel electrode may be provided with slits which extend parallel to the respective tilt azimuths of the liquid crystal molecules. The slits may be formed in a region between one pixel edge of each pixel in the longitudinal direction and the center line of the pixel in the transverse direction in each alignment region. The slits may be formed in regions superimposed on the respective alignment regions arranged next to each other in the longitudinal direction of each pixel such that the slits face each other across a boundary between the alignment regions arranged next to each other.

The four alignment regions may each be superimposed on both a portion of the pixel electrode provided with the slits and a portion of the pixel electrode provided with no slits.

The slits of each pixel electrode may be formed with ends thereof being spaced from at least one of the two sides of the corresponding pixel in the transverse direction and the ends of the pixel electrode provided with slits may be connected to each other with a conductive electrode material.

The pixel electrodes may each include a first pixel electrode configured to apply voltage to two alignment regions arranged next to each other among the four alignment regions and a second pixel electrode configured to apply voltage to the other two alignment regions arranged next to each other, and the first pixel electrode and the second pixel electrode may be configured to apply different voltages to the liquid crystal layer.

Another aspect of the present invention may be a method for manufacturing a liquid crystal display panel, including a photo-alignment treatment step of irradiating, with light from a light source through a polarizer, a first substrate provided with a first vertical alignment film on a surface and a second substrate provided with a second vertical alignment film on a surface, wherein the first vertical alignment film and the second vertical alignment film are photo-alignment films which, upon being subjected to photo-alignment treatment, provide a pre-tilt angle to the liquid crystal molecules, the photo-alignment treatment step includes performing the light irradiation while moving the first substrate or the second substrate or moving the light source relative to the first substrate or the second substrate, the light irradiation direction for the first substrate or the second substrate is parallel to the moving direction of the first substrate or the second substrate or the moving direction of the light source, and a polarization axis of the polarizer is different from the light irradiation direction. The polarization axis of the polarizer and the light irradiation direction may form an angle of substantially 45°. Also, a polarization axis of the polarizer projected on a surface of the first substrate or a surface of the second substrate and the light irradiation direction may form an angle of substantially 45°.

Yet another aspect of the present invention may be a device for manufacturing a liquid crystal display panel, including a mechanism configured to irradiate, with light from a light source through a polarizer, a first substrate provided with a first vertical alignment film on a surface and a second substrate provided with a second vertical alignment film on a surface, wherein the first vertical alignment film and the second vertical alignment film are photo-alignment films which, upon being subjected to photo-alignment treatment, provide a pre-tilt angle to the liquid crystal molecules, the mechanism is configured to perform the light irradiation while moving the first substrate or the second substrate or moving the light source relative to the first substrate or the second substrate, the light irradiation direction for the first substrate or the second substrate is parallel to the moving direction of the first substrate or the second substrate or the moving direction of the light source, and a polarization axis of the polarizer is different from the light irradiation direction. The polarization axis of the polarizer and the light irradiation direction may form an angle of substantially 45°. Also, a polarization axis of the polarizer projected on a surface of the first substrate or a surface of the second substrate and the light irradiation direction may form an angle of substantially 45°.

The features of the present invention described above may appropriately be combined within the spirit of the present invention.

REFERENCE SIGNS LIST

10: pixel
10$a$, 10$b$, 10$c$, 10$d$: alignment region
11: signal line
13$a$, 13$b$, 13$c$: TFT
20: first polarizing plate
30: first substrate
31, 531: pixel electrode
31$a$: first pixel electrode
31$b$: second pixel electrode
33, 431: slit
40: liquid crystal layer
41, 341, 441, 541: liquid crystal molecule
50: second substrate
51: counter electrode
60: second polarizing plate
70: first vertical alignment film
80: second vertical alignment film
90: sealing material
100, 300, 400, 500: liquid crystal display panel
120, 320, 420: dark line
200: device for manufacturing liquid crystal display panel
220: light source
221: light
230, 230A, 230B: polarizer
231, 231A, 231B: polarization axis
240: light-shielding component
250: substrate-transporting stage
252, 352, 452, 552: light irradiation direction
251, 351, 451: moving direction of substrate
253, 353, 453, 553: pre-tilt azimuth
260: mechanism configured to rotate polarizer
270: lamp box
280: mechanism configured to perform irradiation with light from light source through polarizer (light irradiation mechanism)
280A: first light irradiation mechanism
280B: second light irradiation mechanism

The invention claimed is:

1. A method for manufacturing the liquid crystal display panel which includes a plurality of pixels each including a plurality of alignment regions in which an alignment direction of liquid crystal molecules is different from each other when voltage is applied, comprising:
forming a first vertical alignment film on a first substrate including pixel electrodes;
forming a second vertical alignment film on a second substrate including a counter electrode; and
a photo-alignment treatment step of irradiating, with polarized light from a light source through a polarizer, the first substrate provided with the first vertical alignment film on a surface or the second substrate provided with the second vertical alignment film on a surface,
wherein the first vertical alignment film and the second vertical alignment film are photo-alignment films which, upon being subjected to photo-alignment treatment, provide a pre-tilt angle to the liquid crystal molecules,
the photo-alignment treatment step includes performing the polarized light irradiation while moving the first substrate or the second substrate or moving the light source relative to the first substrate or the second substrate,
the polarized light irradiation direction for the first substrate or the second substrate is parallel to the moving direction of the first substrate or the second substrate or the moving direction of the light source, and
a polarization axis of the polarized light projected on the surface of the first substrate or the surface of the second substrate is different from the polarized light irradiation direction.

2. A method for manufacturing the liquid crystal display panel which includes a plurality of pixels each including a plurality of alignment regions in which an alignment direction of liquid crystal molecules is different from each other when voltage is applied, comprising:
forming a first vertical alignment film on a first substrate including pixel electrodes;
forming a second vertical alignment film on a second substrate including a counter electrode; and
a photo-alignment treatment step of irradiating, with polarized light from a light source through a polarizer, the first substrate provided with the first vertical alignment film on a surface or the second substrate provided with the second vertical alignment film on a surface,
wherein the plurality of alignment regions are arranged in a first pixel along a first direction,
a direction orthogonal to the first direction is defined as a second direction, and a pixel adjacent to the first pixel in the second direction is defined as an adjacent pixel,
an arrangement of the plurality of alignment regions within the first pixel is same as an arrangement of the plurality of alignment regions within the adjacent pixel,
the first vertical alignment film and the second vertical alignment film are photo-alignment films which, upon being subjected to photo-alignment treatment, provide a pre-tilt angle to the liquid crystal molecules,
the photo-alignment treatment step includes performing the polarized light irradiation while moving the first substrate or the second substrate or moving the light source relative to the first substrate or the second substrate,
the polarized light irradiation direction for the first substrate or the second substrate is parallel to the moving direction of the first substrate or the second substrate or the moving direction of the light source, and
a polarization axis of the polarized light projected on the surface of the first substrate or the surface of the second substrate is different from the polarized light irradiation direction.

3. A method for manufacturing the liquid crystal display panel which includes a plurality of pixels each including four alignment regions in which an alignment direction of liquid crystal molecules is different from each other when voltage is applied, comprising:
forming a first vertical alignment film on a first substrate including pixel electrodes;
forming a second vertical alignment film on a second substrate including a counter electrode; and
a photo-alignment treatment step of irradiating, with polarized light from a light source through a polarizer, the first substrate provided with the first vertical alignment film on a surface or the second substrate provided with the second vertical alignment film on a surface,
wherein the four alignment regions consists of a first alignment region, a second alignment region, a third alignment region, and a fourth alignment region,
the four alignment regions are arranged along a first direction in order of the first alignment region, the second alignment region, the third alignment region, and the fourth alignment region, within a first pixel,
a direction orthogonal to the first direction is defined as a second direction, and a pixel adjacent to the first pixel in the second direction is defined as an adjacent pixel,
the four alignment regions of the adjacent pixel are arranged along the first direction in order of the first alignment region, the second alignment region, the third alignment region, and the fourth alignment region,
the first vertical alignment film and the second vertical alignment film are photo-alignment films which, upon being subjected to photo-alignment treatment, provide a pre-tilt angle to the liquid crystal molecules,
the photo-alignment treatment step includes performing the polarized light irradiation while moving the first substrate or the second substrate or moving the light source relative to the first substrate or the second substrate,
the polarized light irradiation direction for the first substrate or the second substrate is parallel to the moving direction of the first substrate or the second substrate or the moving direction of the light source, and
a polarization axis of the polarized light projected on the surface of the first substrate or the surface of the second substrate is different from the polarized light irradiation direction.

4. The method according to claim 1,
wherein the polarization axis of the polarized light projected on the surface of the first substrate or the surface of the second substrate and the polarized light irradiation direction form an angle of 30° or more and 60° or less in clockwise or counterclockwise direction.

5. The method according to claim 2,
wherein the polarization axis of the polarized light projected on the surface of the first substrate or the surface of the second substrate and the polarized light irradiation direction form an angle of 30° or more and 60° or less in clockwise or counterclockwise direction.

6. The method according to claim 3,
wherein the polarization axis of the polarized light projected on the surface of the first substrate or the surface of the second substrate and the polarized light irradiation direction form an angle of 30° or more and 60° or less in clockwise or counterclockwise direction.

7. The method according to claim 4,
wherein the polarization axis of the polarized light projected on the surface of the first substrate or the surface of the second substrate and the polarized light irradiation direction form an angle of substantially 45° in the clockwise or counterclockwise direction.

8. The method according to claim 5,
wherein the polarization axis of the polarized light projected on the surface of the first substrate or the surface of the second substrate and the polarized light irradiation direction form an angle of substantially 45° in the clockwise or counterclockwise direction.

9. The method according to claim 6,
wherein the polarization axis of the polarized light projected on the surface of the first substrate or the surface of the second substrate and the polarized light irradiation direction form an angle of substantially 45° in the clockwise or counterclockwise direction.

10. The method according to claim 4,
wherein, in the photo-alignment treatment step, a light-shielding component is arranged between the light source and the first substrate or the second substrate,
the light-shielding component includes a light shielding portion for shielding the polarized light and a transmission portion for transmitting the polarized light, and
a region irradiated with the polarized light is formed on the first substrate or the second substrate via the transmission portion, and a region not irradiated with the polarized light is formed on the first substrate or the second substrate by the light shielding portion.

11. The method according to claim 5,
wherein, in the photo-alignment treatment step, a light-shielding component is arranged between the light source and the first substrate or the second substrate,
the light-shielding component includes a light shielding portion for shielding the polarized light and a transmission portion for transmitting the polarized light, and
a region irradiated with the polarized light is formed on the first substrate or the second substrate via the transmission portion, and a region not irradiated with the polarized light is formed on the first substrate or the second substrate by the light shielding portion.

12. The method according to claim 6,
wherein, in the photo-alignment treatment step, a light-shielding component is arranged between the light source and the first substrate or the second substrate,
the light-shielding component includes a light shielding portion for shielding the polarized light and a transmission portion for transmitting the polarized light, and
a region irradiated with the polarized light is formed on the first substrate or the second substrate via the transmission portion, and a region not irradiated with the polarized light is formed on the first substrate or the second substrate by the light shielding portion.

13. The method according to claim 10,
wherein the photo-alignment treatment step includes a first polarized light irradiation step and a second polarized light irradiation step, and the light-shielding component includes a first light-shielding component and a second light-shielding component,
in the first polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with a first region of the first substrate or the second substrate via the transmission portion of the first light-shielding component, and the polarized light is not irradiated with a second region of the first substrate or the second substrate by the light shielding portion of the first light-shielding component,
in the second polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the second region of the first substrate or the second substrate via the transmission portion of the second light-shielding component, and the polarized light is not irradiated with the first region of the first substrate or the second substrate by the light shielding portion of the second light-shielding component.

14. The method according to claim 11,
wherein the photo-alignment treatment step includes a first polarized light irradiation step and a second polarized light irradiation step, and the light-shielding component includes a first light-shielding component and a second light-shielding component,
in the first polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with a first region of the first substrate or the second substrate via the transmission portion of the first light-shielding component, and the polarized light is not irradiated with a second region of the first substrate or the second substrate by the light shielding portion of the first light-shielding component,
in the second polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the second region of the first substrate or the second substrate via the transmission portion of the second light-shielding component, and the polarized light is not irradiated with the first region of the first substrate or the second substrate by the light shielding portion of the second light-shielding component.

15. The method according to claim 12,
wherein the photo-alignment treatment step includes a first polarized light irradiation step and a second polarized light irradiation step, and the light-shielding component includes a first light-shielding component and a second light-shielding component,
in the first polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with a first region of the first substrate or the second substrate via the transmission portion of the first light-shielding component, and the polarized light is not irradiated with a second region of the first substrate or the second substrate by the light shielding portion of the first light-shielding component, in the second polarized light irradiation step, the polarization axis of the polarized light projected on the surface of the first substrate or the surface of the second substrate and the polarized light irradiation direction form an angle of 30° or more and 60° or less in the counterclockwise direction, the polarized light is irradiated with the second region of the first substrate or the second substrate via the transmission portion of the second light-shielding component, and the polarized light is not irradiated with the first region of the first substrate or the second substrate by the light shielding portion of the second light-shielding component.

16. The method according to claim 10, wherein the photo-alignment treatment step includes a first polarized light irradiation step and a second polarized light irradiation step, and the light-shielding component includes a first light-shielding component and a second light-shielding component, in the first polarized light irradiation step, the polarization axis of the polarized light projected on the surface of the first substrate or the surface of the second substrate and the polarized light irradiation direction form an angle of substantially 45° in the clockwise direction, the polarized light is irradiated with a first region of the first substrate or the second substrate via the transmission portion of the first light-shielding component, and the polarized light is not irradiated with a second region of the first substrate or the second substrate by the light shielding portion of the first light-shielding component, in the second polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the second region of the first substrate or the second substrate via the transmission portion of the second light-shielding component, and the polarized light is not irradiated with the first region of the first substrate or the second substrate by the light shielding portion of the second light-shielding component.

17. The method according to claim 11, wherein the photo-alignment treatment step includes a first polarized light irradiation step and a second polarized light irradiation step, and the light-shielding component includes a first light-shielding component and a second light-shielding component, in the first polarized light irradiation step, the polarization axis of the polarized light projected on the surface of the first substrate or the surface of the second substrate and the polarized light irradiation direction form an angle of substantially 45° in the clockwise direction, the polarized light is irradiated with a first region of the first substrate or the second substrate via the transmission portion of the first light-shielding component, and the polarized light is not irradiated with a second region of the first substrate or the second substrate by the light shielding portion of the first light-shielding component, in the second polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the second region of the first substrate or the second substrate via the transmission portion of the second light-shielding component, and the polarized light is not irradiated with the first region of the first substrate or the second substrate by the light shielding portion of the second light-shielding component.

18. The method according to claim 12, wherein the photo-alignment treatment step includes a first polarized light irradiation step and a second polarized light irradiation step, and the light-shielding component includes a first light-shielding component and a second light-shielding component, in the first polarized light irradiation step, the polarization axis of the polarized light projected on the surface of the first substrate or the surface of the second substrate and the polarized light irradiation direction form an angle of substantially 45° in the clockwise direction, the polarized light is irradiated with a first region of the first substrate or the second substrate via the transmission portion of the first light-shielding component, and the polarized light is not irradiated with a second region of the first substrate or the second substrate by the light shielding portion of the first light-shielding component, in the second polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the second region of the first substrate or the second substrate via the transmission portion of the second light-shielding component, and the polarized light is not irradiated with the first region of the first substrate or the second substrate by the light shielding portion of the second light-shielding component.

19. The method according to claim 10, wherein the photo-alignment treatment step includes a first polarized light irradiation step, a second polarized light irradiation step, a third polarized light irradiation step and a fourth polarized light irradiation step, and the light-shielding component includes a first light-shielding component, a second light-shielding component, a third light-shielding component, and a fourth light-shielding component, in the first polarized light irradiation step, the polarization axis of the polarized light projected on the surface of the first substrate or the surface of the second substrate and the polarized light irradiation direction form an angle of 30° or more and 60° or less in the clockwise direction, the polarized light is irradiated with a first region of the first substrate or the second substrate via the transmission portion of the first light-shielding component, and the polarized light is not irradiated with a second region, a third region, and a fourth region of the first substrate or the second substrate by the light shielding portion of the first light-shielding component, in the second polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the second region of the first substrate or the second substrate via the transmission portion of the second light-shielding component, and the polarized light is not irradiated with the first region, the third region, and the fourth region of the first substrate or the second substrate by the light shielding portion of the second light-shielding component,
in the third polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with the third region of the first substrate or the second substrate from a direction opposite to an irradiation direction in the first polarized light irradiation step via the transmission portion of the third light-shielding component, and the polarized light is not irradiated with the first region, the second region, and the fourth region of the first substrate or the second substrate by the light shielding portion of the third light-shielding component,
in the fourth polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the fourth region of the first substrate or the second substrate from a direction opposite to an irradiation direction in the second polarized light irradiation step via the transmission portion of the fourth light-shielding component, and the polarized light is not irradiated with the first region, the second region, and the third region of the first substrate or the second substrate by the light shielding portion of the fourth light-shielding component.

20. The method according to claim 11,
wherein the photo-alignment treatment step includes a first polarized light irradiation step, a second polarized light irradiation step, a third polarized light irradiation step and a fourth polarized light irradiation step, and the light-shielding component includes a first light-shielding component, a second light-shielding component, a third light-shielding component, and a fourth light-shielding component,
in the first polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with a first region of the first substrate or the second substrate via the transmission portion of the first light-shielding component, and the polarized light is not irradiated with a second region, a third region, and a fourth region of the first substrate or the second substrate by the light shielding portion of the first light-shielding component, in the second polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the second region of the first substrate or the second substrate via the transmission portion of the second light-shielding component, and the polarized light is not irradiated with the first region, the third region, and the fourth region of the first substrate or the second substrate by the light shielding portion of the second light-shielding component,
in the third polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with the third region of the first substrate or the second substrate from a direction opposite to an irradiation direction in the first polarized light irradiation step via the transmission portion of the third light-shielding component, and the polarized light is not irradiated with the first region, the second region, and the fourth region of the first substrate or the second substrate by the light shielding portion of the third light-shielding component,
in the fourth polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the fourth region of the first substrate or the second substrate from a direction opposite to an irradiation direction in the second polarized light irradiation step via the transmission portion of the fourth light-shielding component, and the polarized light is not irradiated with the first region, the second region, and the third region of the first substrate or the second substrate by the light shielding portion of the fourth light-shielding component.

21. The method according to claim 12,
wherein the photo-alignment treatment step includes a first polarized light irradiation step, a second polarized light irradiation step, a third polarized light irradiation step and a fourth polarized light irradiation step, and the light-shielding component includes a first light-shielding component, a second light-shielding component, a third light-shielding component, and a fourth light-shielding component,
in the first polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with a first region of the first substrate or the second substrate via the transmission portion of the first light-shielding component, and the polarized light is not irradiated with a second region, a third region, and a fourth region of the first substrate or the second substrate by the light shielding portion of the first light-shielding component, in the second polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the second region of the first substrate or the second substrate via the transmission portion of the second light-shielding component, and the polarized light is not irradiated with the first region, the third region, and the fourth region of the first substrate or the second substrate by the light shielding portion of the second light-shielding component,
in the third polarized light irradiation step,
the polarization axis of the polarized light projected on the surface of the first substrate or the surface of the second substrate and the polarized light irradiation direction form an angle of 30° or more and 60° or less in the clockwise direction,
the polarized light is irradiated with the third region of the first substrate or the second substrate from a direction opposite to an irradiation direction in the first polarized light irradiation step via the transmission portion of the third light-shielding component, and the polarized light is not irradiated with the first region, the second region, and the fourth region of the first substrate or the second substrate by the light shielding portion of the third light-shielding component,
in the fourth polarized light irradiation step,
the polarization axis of the polarized light projected on the surface of the first substrate or the surface of the second substrate and the polarized light irradiation direction form an angle of 30° or more and 60° or less in the counterclockwise direction,
the polarized light is irradiated with the fourth region of the first substrate or the second substrate from a direction opposite to an irradiation direction in the second polarized light irradiation step via the transmission portion of the fourth light-shielding component, and the polarized light is not irradiated with the first region, the second region, and the third region of the first substrate or the second substrate by the light shielding portion of the fourth light-shielding component.

22. The method according to claim 10,
wherein the photo-alignment treatment step includes a first polarized light irradiation step, a second polarized light irradiation step, a third polarized light irradiation step and a fourth polarized light irradiation step, and the light-shielding component includes a first light-shielding component, a second light-shielding component, a third light-shielding component, and a fourth light-shielding component,
in the first polarized light irradiation step,
the polarization axis of the polarized light projected on the surface of the first substrate or the surface of the second substrate and the polarized light irradiation direction form an angle of substantially 45° in the clockwise direction,
the polarized light is irradiated with a first region of the first substrate or the second substrate via the transmission portion of the first light-shielding component, and the polarized light is not irradiated with a second region, a third region, and a fourth region of the first substrate or the second substrate by the light shielding portion of the first light-shielding component, in the second polarized light irradiation step,
the polarization axis of the polarized light projected on the surface of the first substrate or the surface of the second substrate and the polarized light irradiation direction form an angle of substantially 45° in the counterclockwise direction,
the polarized light is irradiated with the second region of the first substrate or the second substrate via the transmission portion of the second light-shielding component, and the polarized light is not irradiated with the first region, the third region, and the fourth region of the first substrate or the second substrate by the light shielding portion of the second light-shielding component,
in the third polarized light irradiation step,
the polarization axis of the polarized light projected on the surface of the first substrate or the surface of the second substrate and the polarized light irradiation direction form an angle of substantially 45° in the clockwise direction,
the polarized light is irradiated with the third region of the first substrate or the second substrate from a direction opposite to an irradiation direction in the first polarized light irradiation step via the transmission portion of the third light-shielding component, and the polarized light is not irradiated with the first region, the second region, and the fourth region of the first substrate or the second substrate by the light shielding portion of the third light-shielding component,
in the fourth polarized light irradiation step,
the polarization axis of the polarized light projected on the surface of the first substrate or the surface of the second substrate and the polarized light irradiation direction form an angle of substantially 45° in the counterclockwise direction,
the polarized light is irradiated with the fourth region of the first substrate or the second substrate from a direction opposite to an irradiation direction in the second polarized light irradiation step via the transmission portion of the fourth light-shielding component, and the polarized light is not irradiated with the first region, the second region, and the third region of the first substrate or the second substrate by the light shielding portion of the fourth light-shielding component.

23. The method according to claim 11,
wherein the photo-alignment treatment step includes a first polarized light irradiation step, a second polarized light irradiation step, a third polarized light irradiation step and a fourth polarized light irradiation step, and the light-shielding component includes a first light-shielding component, a second light-shielding component, a third light-shielding component, and a fourth light-shielding component,
in the first polarized light irradiation step,
the polarization axis of the polarized light projected on the surface of the first substrate or the surface of the second substrate and the polarized light irradiation direction form an angle of substantially 45° in the clockwise direction,
the polarized light is irradiated with a first region of the first substrate or the second substrate via the transmission portion of the first light-shielding component, and the polarized light is not irradiated with a second region, a third region, and a fourth region of the first substrate or the second substrate by the light shielding portion of the first light-shielding component, in the second polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the second region of the first substrate or the second substrate via the transmission portion of the second light-shielding component, and the polarized light is not irradiated with the first region, the third region, and the fourth region of the first substrate or the second substrate by the light shielding portion of the second light-shielding component, in the third polarized light irradiation step, the polarization axis of the polarized light projected on the surface of the first substrate or the surface of the second substrate and the polarized light irradiation direction form an angle of substantially 45° in the clockwise direction, the polarized light is irradiated with the third region of the first substrate or the second substrate from a direction opposite to an irradiation direction in the first polarized light irradiation step via the transmission portion of the third light-shielding component, and the polarized light is not irradiated with the first region, the second region, and the fourth region of the first substrate or the second substrate by the light shielding portion of the third light-shielding component, in the fourth polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the fourth region of the first substrate or the second substrate from a direction opposite to an irradiation direction in the second polarized light irradiation step via the transmission portion of the fourth light-shielding component, and the polarized light is not irradiated with the first region, the second region, and the third region of the first substrate or the second substrate by the light shielding portion of the fourth light-shielding component.

24. The method according to claim 12, wherein the photo-alignment treatment step includes a first polarized light irradiation step, a second polarized light irradiation step, a third polarized light irradiation step and a fourth polarized light irradiation step, and the light-shielding component includes a first light-shielding component, a second light-shielding component, a third light-shielding component, and a fourth light-shielding component, in the first polarized light irradiation step, the polarization axis of the polarized light projected on the surface of the first substrate or the surface of the second substrate and the polarized light irradiation direction form an angle of substantially 45° in the clockwise direction, the polarized light is irradiated with a first region of the first substrate or the second substrate via the transmission portion of the first light-shielding component, and the polarized light is not irradiated with a second region, a third region, and a fourth region of the first substrate or the second substrate by the light shielding portion of the first light-shielding component, in the second polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the second region of the first substrate or the second substrate via the transmission portion of the second light-shielding component, and the polarized light is not irradiated with the first region, the third region, and the fourth region of the first substrate or the second substrate by the light shielding portion of the second light-shielding component, in the third polarized light irradiation step, the polarization axis of the polarized light projected on the surface of the first substrate or the surface of the second substrate and the polarized light irradiation direction form an angle of substantially 45° in the clockwise direction, the polarized light is irradiated with the third region of the first substrate or the second substrate from a direction opposite to an irradiation direction in the first polarized light irradiation step via the transmission portion of the third light-shielding component, and the polarized light is not irradiated with the first region, the second region, and the fourth region of the first substrate or the second substrate by the light shielding portion of the third light-shielding component, in the fourth polarized light irradiation step, the polarization axis of the polarized light projected on the surface of the first substrate or the surface of the second substrate and the polarized light irradiation direction form an angle of substantially 45° in the counterclockwise direction, the polarized light is irradiated with the fourth region of the first substrate or the second substrate from a direction opposite to an irradiation direction in the second polarized light irradiation step via the transmission portion of the fourth light-shielding component, and the polarized light is not irradiated with the first region, the second region, and the third region of the first substrate or the second substrate by the light shielding portion of the fourth light-shielding component.

\* \* \* \* \*